United States Patent
Bean et al.

(10) Patent No.: US 11,973,357 B1
(45) Date of Patent: Apr. 30, 2024

(54) DEVICE AND METHOD FOR POWER MANAGEMENT IN A SOLAR-POWERED ELECTRONIC DEVICE

(71) Applicant: Geotab Inc., Oakville (CA)

(72) Inventors: Jonathan Bean, Arvada, CO (US); Joseph James Deppong, Vernon Hills, IL (US); Andrew James Murfin, Denver, CO (US)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/508,646

(22) Filed: Nov. 14, 2023

Related U.S. Application Data

(60) Provisional application No. 63/540,415, filed on Sep. 26, 2023.

(51) Int. Cl.
*H02J 7/00* (2006.01)
*H02J 7/35* (2006.01)

(52) U.S. Cl.
CPC ........ *H02J 7/00038* (2020.01); *H02J 7/0036* (2013.01); *H02J 7/0047* (2013.01); *H02J 7/35* (2013.01); *H02J 2300/24* (2020.01)

(58) Field of Classification Search
USPC .................................................. 320/106, 137
See application file for complete search history.

(56) References Cited

U.S. PATENT DOCUMENTS

| | | | |
|---|---|---|---|
| 5,025,202 A | * | 6/1991 | Ishii ................ H02J 7/35 320/101 |
| 6,512,466 B2 | | 1/2003 | Flick |
| 6,819,269 B2 | | 11/2004 | Flick |
| 7,312,696 B2 | | 12/2007 | Flick |
| 10,173,547 B1 | | 1/2019 | Denson |
| 11,204,637 B2 | | 12/2021 | Tuan et al. |
| 11,675,042 B1 | | 6/2023 | Lloyd et al. |
| 11,709,500 B2 | | 7/2023 | Lloyd et al. |
| 2003/0050038 A1 | | 3/2003 | Haave et al. |
| 2004/0196182 A1 | | 10/2004 | Unnold |
| 2012/0235860 A1 | | 9/2012 | Ghazarian |
| 2014/0378081 A1 | | 12/2014 | Xu |
| 2015/0001932 A1 | * | 1/2015 | Inoue ............... H02J 7/35 307/24 |
| 2018/0041626 A1 | | 2/2018 | Dods et al. |
| 2018/0131192 A1 | * | 5/2018 | Rozman ............ H02J 1/08 |
| 2020/0074397 A1 | | 3/2020 | Burda et al. |
| 2021/0318692 A1 | | 10/2021 | Lloyd et al. |
| 2021/0376643 A1 | | 12/2021 | Paparrizos et al. |
| 2022/0059218 A1 | | 2/2022 | Fischer |
| 2022/0217517 A1 | | 7/2022 | Daoura et al. |

* cited by examiner

*Primary Examiner* — Samuel Berhanu
(74) *Attorney, Agent, or Firm* — Sherif A. Abdel-Kader

(57) ABSTRACT

An electronic device powered by a solar panel and a rechargeable battery. The electronic device prevents unnecessary charging and discharging of the rechargeable battery by disconnecting the rechargeable battery when the rechargeable battery is fully charged. The electronic device detects and reports a defective rechargeable battery by powering the electronic device off of the solar panel. The electronic device detects and handles brownout conditions when powered by the solar panel by re-connecting the rechargeable battery.

20 Claims, 11 Drawing Sheets

DEVICE AND METHOD FOR POWER MANAGEMENT IN A SOLAR-POWERED ELECTRONIC DEVICE

RELATED APPLICATIONS

This application claims priority from U.S. provisional application 63/540,415 filed Sep. 26, 2023, the contents of which are herein incorporated by reference.

FIELD

The present disclosure generally relates to electronic devices, and more specifically to a device and a method for power management in a solar-powered electronic device.

BACKGROUND

Solar-powered electronic devices are typically powered by both a rechargeable battery and a solar panel. In a typical arrangement, the electronic components of the solar-powered electronic device are powered by the rechargeable battery and the solar panel is configured to charge the rechargeable battery.

A solar-powered electronic device needs to manage the electric power generated by the solar panel and the rechargeable battery for optimal operation, reliability, and longevity.

SUMMARY

In one aspect of the present disclosure, there is provided a method in an electronic device comprising a power management subsystem, a controller, and a plurality of peripherals, the electronic device powered by a solar panel and a rechargeable battery both connected at respective positive terminals thereof to the controller and the plurality of peripherals. The method comprises determining whether the solar panel is connected at a negative terminal thereof to a ground terminal and in response to determining that the solar panel is connected at the negative terminal thereof to the ground terminal, disconnecting the negative terminal from the ground terminal. The method further comprises reading a voltage at the negative terminal of the solar panel and in response to determining based on the voltage that the solar panel is generating sufficient electrical energy to power at least some of the plurality of peripherals, connecting the negative terminal of the solar panel to the ground terminal.

In some implementations, the method further comprises in response to determining, based on the voltage, that the solar panel is not generating sufficient electrical energy to power at least some of the plurality of peripherals, keeping the negative terminal of the solar panel disconnected from the ground terminal. Advantageously, the rechargeable battery does not drain through the solar panel degrading the solar panel cells when the solar panel is not generating electric energy. Thus the lifespan of the solar panel is increased as damage to the solar cells is minimized.

In some implementations, the negative terminal of the solar panel is connected with the ground terminal via an N-channel Field Effect Transistor (NFET) switch having a source, a gate, and a drain. In such implementations, the NFET switch is connected at the source thereof to the ground terminal and connected at the drain thereof to the negative terminal of the solar panel, and determining that the solar panel is generating sufficient energy comprises detecting a negative voltage at the drain of the NFET switch. Advantageously, determining that the solar panel is generating sufficient energy is done without connecting the negative terminal of the solar panel to the ground. This prevents draining of the rechargeable battery through the solar panel during the determining.

In some implementations, the negative terminal of the solar panel is connected with the ground terminal via a P-channel Field Effect Transistor (PFET) switch having a source, a gate, and a drain. In such implementations, the PFET switch is connected at the drain thereof to the ground terminal and connected at the source thereof to the negative terminal of the solar panel, and determining that the solar panel is generating sufficient energy comprises detecting a negative voltage at the source of the PFET switch. Advantageously, determining that the solar panel is generating sufficient energy is done without connecting the negative terminal of the solar panel to the ground. This prevents draining of the rechargeable battery through the solar panel during the determining.

In some implementations, the negative terminal of the solar panel is connected with the ground terminal via an N-channel Field Effect Transistor (NFET) switch having a source, a gate, and a drain. In such implementations, the NFET switch is connected at the source thereof to the ground terminal and connected at the drain thereof to the negative terminal of the solar panel and determining that the solar panel is not generating sufficient energy comprises detecting a positive voltage at the drain of the NFET switch. Advantageously, determining that the solar panel is not generating sufficient energy is done without connecting the negative terminal of the solar panel to the ground. This prevents draining of the rechargeable battery through the solar panel during the determining.

In some implementations, the negative terminal of the solar panel is connected with the ground terminal via a P-channel Field Effect Transistor (PFET) switch having a source, a gate, and a drain. In such implementations, the PFET switch is connected at the drain thereof to the ground terminal and connected at the source thereof to the negative terminal of the solar panel, and determining that the solar panel is not generating sufficient energy comprises detecting a positive voltage at the source of the PFET switch. Advantageously, determining that the solar panel is not generating sufficient energy is done without connecting the negative terminal of the solar panel to the ground. This prevents draining of the rechargeable battery through the solar panel during the determining.

In some implementations, the negative terminal of the solar panel is connected with the ground terminal via a Field Effect Transistor (FET) switch and connecting the negative terminal with the ground terminal comprises closing the FET switch.

In some implementations, reading the voltage at the negative terminal of the solar panel comprises enabling a voltage sensor connected to the negative terminal of the solar panel and reading a voltage sensor signal of the voltage sensor. Advantageously, the voltage sensor is enabled only when necessary to determine whether the solar panel is generating sufficient energy and is otherwise disabled. Keeping the voltage sensor disabled most of the time saves electric energy.

In some implementations, the voltage sensor comprises an operational amplifier having an inverting input, a non-inverting input, a positive supply terminal, a negative supply terminal, and an output. In such implementations, the negative supply terminal is connected with the negative terminal of the solar panel, the output of the operational amplifier is connected to the inverting input, and the non-inverting input of the operational amplifier is connected to ground. Enabling the voltage sensor comprises asserting, by the controller, a voltage sensor enable signal connected to the positive supply terminal of the operational amplifier. This implementation of the voltage sensor has the advantage of measuring a voltage at the negative supply terminal of the solar panel that may be either positive or negative, while providing a voltage sensor signal that is always positive and thus is suitable for conversion to a digital value by an analog to digital converter, for example.

In some implementations, the voltage sensor signal of the voltage sensor comprises a positive analog signal and reading the voltage sensor signal of the voltage sensor comprises converting the positive analog signal to a digital value. Advantageously, the digital value can be compared with particular values in firmware and used to decide whether to reconnect the solar panel or keep it disconnected.

In another aspect of the present disclosure, there is provided an electronic device comprising a controller, a memory coupled to the controller, and a plurality of peripherals. Additionally, the electronic device comprises a solar panel coupled to the controller, the memory, and the plurality of peripherals. The electronic device further comprises a rechargeable battery coupled to the controller, to the memory, to the plurality of peripherals, and to the solar panel. Furthermore, the electronic device comprises a power management subsystem coupled to the solar panel and to the rechargeable battery, the power management subsystem including a voltage sensor connected with a negative terminal of the solar panel and a solar panel bottom switch connected with the negative terminal of the solar panel. The memory stores machine-executable programming instructions which configure the electronic device to determine whether the solar panel is connected at a negative terminal thereof to a ground terminal via the solar panel bottom switch. In response to determining that the solar panel is connected at the negative terminal thereof to the ground terminal, the machine-executable programming instructions configure the electronic device to disconnect the negative terminal from the ground terminal. The machine-executable programming instructions further configure the electronic device to read a voltage at the negative terminal of the solar panel. In response to determining, based on the voltage, that the solar panel is generating sufficient electrical energy to power at least some of the plurality of peripherals, the machine-executable programming instructions configure the electronic device to connect the negative terminal of the solar panel with the ground terminal.

In some implementations, the machine-executable programming instructions further configure the electronic device to read a voltage at the negative terminal of the solar panel. In response to determining, based on the voltage, that the solar panel is not generating sufficient electrical energy to power at least some of the plurality of peripherals, the machine-executable programming instructions configure the electronic device to keep the negative terminal of the solar panel disconnected from the ground terminal.

In some implementations, the solar panel bottom switch comprises an N-channel Field Effect Transistor (NFET) switch having a source, a gate, and a drain. In such implementations, the NFET switch is connected at the source thereof to the ground terminal and connected at the drain thereof to the negative terminal of the solar panel, and the machine-executable programming instructions which configure the electronic device to determine that the solar panel is generating sufficient energy comprise machine-executable programming instructions which detect a negative voltage at the drain of the NFET switch.

In some implementations, the solar panel bottom switch comprises a P-channel Field Effect Transistor (PFET) switch having a source, a gate, and a drain. In such implementations, the PFET switch is connected at the drain thereof to the ground terminal and connected at the source thereof to the negative terminal of the solar panel, and the machine-executable programming instructions which determine that the solar panel is generating sufficient energy comprise machine-executable programming instructions which configure the electronic device to detect a negative voltage at the source of the PFET switch.

In some implementations, the solar panel bottom switch comprises an N-channel Field Effect Transistor (NFET) switch having a source, a gate, and a drain. In such implementations, the NFET switch is connected at the source thereof to the ground terminal and connected at the drain thereof to the negative terminal of the solar panel, and the machine-executable programming instructions which configure the electronic device to determine that the solar panel is not generating sufficient energy comprise machine-executable programming instructions which configure the electronic device to detect a positive voltage at the drain of the NFET switch.

In some implementations, solar panel bottom switch comprises a P-channel Field Effect Transistor (PFET) switch having a source, a gate, and a drain. In such implementations, the PFET switch is connected at the drain thereof to the ground terminal and connected at the source thereof to the negative terminal of the solar panel, and the machine-executable programming instructions which determine that the solar panel is not generating sufficient energy comprise machine-executable programming instructions which configure the electronic device to detect a positive voltage at the source of the PFET switch.

In some implementations, the solar panel bottom switch comprises a Field Effect Transistor (FET) switch and the machine-executable programming instructions which configure the electronic device to connect the negative terminal with to the ground terminal comprise machine-executable programming instructions which close the FET switch.

In some implementations, the machine-executable programming instructions which configure the electronic device to read the voltage at the negative terminal of the solar panel comprise machine-executable programming instructions which configure the electronic device to enable the voltage sensor I and read a voltage sensor signal of the voltage sensor.

In some implementations, the voltage sensor comprises an operational amplifier having an inverting input, a non-inverting input, a positive supply terminal, a negative supply terminal, and an output. In such implementations, the negative supply terminal is connected to the negative terminal of the solar panel, the output of the operational amplifier is connected to the inverting input thereof, the voltage sensor signal of the voltage sensor is the output of the operational amplifier, the non-inverting input of the operational amplifier is connected to ground, and the machine-executable programming instructions which configure the electronic device to enable the voltage sensor comprise the machine-executable programming instructions which configure the electronic device to assert, by the controller, a signal connected to the positive supply terminal of the operational amplifier.

In some implementations, the voltage sensor signal of the voltage sensor comprises a positive analog signal and the machine-executable programming instructions which configure the electronic device to read the voltage sensor signal of the voltage sensor comprise machine-executable programming instructions which configure the electronic device to convert the positive analog signal to a digital value.

In yet another aspect of the present disclosure, there is provided a method in an electronic device comprising a power management subsystem, a controller, and a plurality of peripherals, the electronic device powered by a solar panel and a rechargeable battery both connected at respective positive terminals thereof with the controller and the plurality of peripherals via an unregulated voltage bus. The method comprises reading a voltage of the unregulated voltage bus. In response to determining based on the voltage of the unregulated voltage bus that the rechargeable battery is fully charged and in response to determining that the solar panel provides sufficient electric energy, the method further comprises disconnecting the rechargeable battery from the unregulated voltage bus. Advantageously, the rechargeable battery is not repeatedly and unnecessarily being discharged and recharged when it is already fully charged. This prolongs the battery life.

In some implementations, determining that the solar panel provides sufficient electric energy comprises disconnecting the negative terminal of the solar panel from a ground terminal and detecting by a voltage sensor a negative voltage at the negative terminal of the solar panel.

In some implementations, the voltage sensor comprises an operational amplifier having an inverting input, a non-inverting input, a positive supply terminal, a negative supply terminal, and an output. In such implementations the negative supply terminal is connected to the negative terminal of the solar panel, the output of the operational amplifier is connected to the inverting input, a voltage sensor signal of the voltage sensor is the output of the operational amplifier, the non-inverting input of the operational amplifier is connected to ground, and enabling the voltage sensor comprises asserting by the controller a signal connected to the positive supply terminal of the operational amplifier.

In some implementations, the voltage sensor signal of the voltage sensor comprises a positive analog signal and reading the voltage sensor signal of the voltage sensor comprises converting the positive analog signal to a digital value.

In some implementations, the negative terminal of the solar panel is connected with a ground terminal via an N-channel Field Effect Transistor (NFET) switch having a source, a gate, and a drain. In such implementations, the NFET switch is connected at the source thereof to the ground terminal and connected at the drain thereof to the negative terminal of the solar panel, and determining that the solar panel is generating sufficient energy comprises detecting a negative voltage at the drain of the NFET switch.

In some implementations, disconnecting the rechargeable battery from the unregulated voltage bus comprises opening a top battery switch between a positive terminal of the rechargeable battery and the unregulated voltage bus and opening a bottom battery switch between a negative terminal of the rechargeable battery and a ground terminal.

In some implementations, the method further comprises in response to determining that the rechargeable battery is connected to the unregulated voltage bus and in response to determining, based on the voltage of the unregulated voltage bus, that the rechargeable battery is defective, and in response to determining that the solar panel provides sufficient electric energy to power up a network interface of the electronic device, the method further comprises powering up the network interface and sending a notification to a remote server indicating that the rechargeable battery is defective.

In some implementations, the method further comprises in response to determining that the rechargeable battery is disconnected from the unregulated voltage bus and in response to determining that a potential brownout condition based on the voltage of the unregulated voltage bus, connecting the rechargeable battery to the unregulated voltage bus.

In some implementations, in response to determining that the rechargeable battery is disconnected from the unregulated voltage bus and in response to determining that a potential brownout condition based on the voltage of the unregulated voltage bus, and in response to determining that the solar panel is not generating sufficient electric energy, the method further includes disconnecting the solar panel at the negative terminal thereof from a ground terminal.

In some implementations, the negative terminal of the solar panel is connected with the ground terminal via an N-channel Field Effect Transistor (NFET) switch having a source, a gate, and a drain. The NFET switch is connected at the source thereof to the ground terminal and connected at the drain thereof to the negative terminal of the solar panel and determining that the solar panel is not generating sufficient energy comprises detecting a positive voltage at the drain of the NFET switch.

In a further aspect of the present disclosure, there is provided an electronic device comprising a controller; a memory coupled to the controller; a plurality of peripherals coupled to the controller; an unregulated voltage bus; a rechargeable battery for providing power to the controller, the memory, and the plurality of peripherals via the unregulated voltage bus; a solar panel for recharging the rechargeable battery and for providing power to the controller, the memory, and the plurality of peripherals via the unregulated voltage bus; and a power management subsystem coupled to the controller, the rechargeable battery, and the solar panel. The memory stores machine-executable programming instructions which when executed by the controller configures the electronic device to read a voltage of the unregulated voltage bus. In response to determining that the rechargeable battery is connected to the unregulated voltage bus, in response to determining based on the voltage of the unregulated voltage bus that the rechargeable battery is fully charged, and in response to determining that the solar panel provides sufficient electric energy, the machine-executable programming instructions configure the electronic device to disconnect the rechargeable battery from the unregulated voltage bus.

In some implementations, the machine-executable programming instructions which configure the electronic device to determine that the solar panel provides sufficient electric energy comprise machine-executable programming instructions which configure the electronic device to disconnect the negative terminal of the solar panel from a ground terminal and detect, by a voltage sensor, a negative voltage at the negative terminal of the solar panel.

In some implementations, the voltage sensor comprises an operational amplifier having an inverting input, a non-inverting input, a positive supply terminal, a negative supply terminal, and an output. In such implementations, the negative supply terminal is connected to the negative terminal of the solar panel, the output of the operational amplifier is connected to the inverting input, a voltage sensor signal of the voltage sensor is the output of the operational amplifier, the non-inverting input of the operational amplifier is connected to ground, and the machine-executable programming instructions which configure the electronic device to enable the voltage sensor comprise machine-executable programming instructions which configure the electronic device to assert by the controller a signal connected to the positive supply terminal of the operational amplifier.

In some implementations, the voltage sensor signal of the voltage sensor comprises a positive analog signal and the machine-executable programming instructions which configure the electronic device to read the voltage sensor signal of the voltage sensor comprise machine-executable which configure the electronic device to convert the positive analog signal to a digital value.

In some implementations, the negative terminal of the solar panel is connected with a ground terminal via an N-channel Field Effect Transistor (NFET) switch having a source, a gate, and a drain. In such implementations, the NFET switch is connected at the source thereof to the ground terminal and connected at the drain thereof to the negative terminal of the solar panel and the machine-executable programming instructions which configure the electronic device to determine that the solar panel is generating sufficient energy comprise machine-executable programming instructions which configure the electronic device to detect a negative voltage at the drain of the NFET switch.

In some implementations, the machine-executable programming instructions which configure the electronic device to disconnect the rechargeable battery from the unregulated voltage bus comprise machine-executable programming instructions which configure the electronic device to open a top battery switch between a positive terminal of the rechargeable battery and the unregulated voltage bus and open a bottom battery switch between a negative terminal of the rechargeable battery and a ground terminal.

In some implementations, the machine-executable programming instructions further configure the electronic device in response to determining that the rechargeable battery is connected to the unregulated voltage bus, in response to determining based on the voltage of the unregulated voltage bus that the rechargeable battery is defective, and in response to determining that the solar panel provides sufficient electric energy, to power up the network interface and send a notification to a remote server indicating that the rechargeable battery is defective.

In some implementations, the machine-executable programming instructions further configure the electronic device to connect the rechargeable battery to the unregulated voltage bus in response to determining that the rechargeable battery is disconnected from the unregulated voltage bus and in response to determining that a potential brownout condition based on the voltage of the unregulated voltage bus.

In some implementations, the machine-executable programming instructions further configure the electronic device in response to determining that the rechargeable battery is disconnected from the unregulated voltage bus, in response to determining that a potential brownout condition based on the voltage of the unregulated voltage bus, and in response to determining that the solar panel is not generating sufficient electric energy, to disconnect the solar panel at the negative terminal thereof from a ground terminal.

In some implementations, the negative terminal of the solar panel is connected with the ground terminal via an N-channel Field Effect Transistor (NFET) switch having a source, a gate, and a drain. In such implementations, the NFET switch is connected at the source thereof to the ground terminal and connected at the drain thereof to the negative terminal of the solar panel and the machine-executable programming instructions which configure the electronic device to determine that the solar panel is not generating sufficient energy comprise machine-executable programming instructions which configure the electronic device to detect a positive voltage at the drain of the NFET switch.

BRIEF DESCRIPTION OF THE DRAWINGS

Exemplary non-limiting embodiments of the present disclosure are described with reference to the accompanying drawings in which.

DETAILED DESCRIPTION

Figure 1:
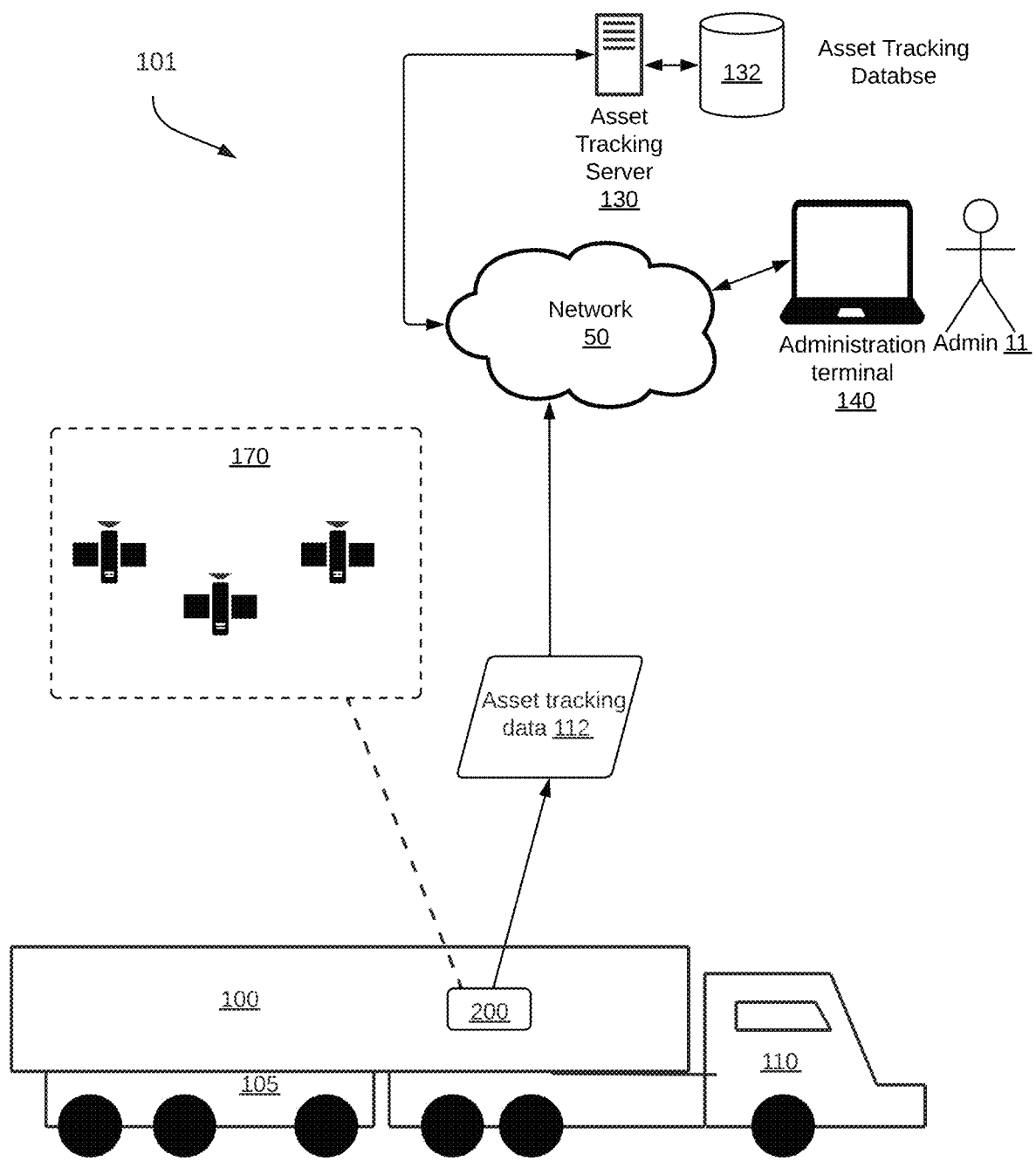
FIG. 1 is a schematic diagram of a telematics system including an asset tracker coupled to an engineless asset.

The present disclosure relates generally to solar-powered electronic devices powered by a rechargeable battery and a solar panel. More specifically, the present disclosure provides a power management module for a solar-powered electronic device. The power management module uses a combination of discrete electronic components and firmware to manage the operation and configuration of both the rechargeable battery and the solar panel. Additionally, the present disclosure provides methods for power management of a solar-powered electronic device.

One example of a solar-powered electronic device is a solar-powered asset tracker. An asset tracker is an electronic device deployed in an asset for tracking the location and condition thereof. An asset tracker is typically part of an asset tracking system. An asset tracking system allows an administrator to track the location and condition of one or more than one assets. An asset may be a vehicle, a piece of equipment, a shipping container, a trailer, a tank, or any other type of asset whose location and condition need to be tracked. The power management module and the method for power management of a solar-powered electronic device presented in this disclosure are not, however, limited by such embodiment.

The solar-powered electronic device discussed in this disclosure is an electronic device that can practically operate off of a rechargeable battery and/or a solar panel. Examples a solar-powered electronic device include, but are not limited to, an asset tracker; a communication and signal booster such as a Wireless Fidelity (Wi-Fi) extender or a cellular signal booster; an electronic weather station including rain gauges, temperature sensors, anemometers, and barometers; an electronic wireless surveillance system including cameras, motion sensors, and communication modules; a ventilation system, such as attic fans and ventilation systems for vehicles; and any other electronic device that utilizes both a solar panel and a rechargeable battery.

In this disclosure a "solar panel" refers to a portable solar panel suitable for use with an electronic device, not large solar panels typically installed on building rooftops. A portable solar panel is a compact and lightweight energy harvesting device that converts sunlight into electrical energy by using photovoltaic cells. Photovoltaic cells are made of materials that generate electrons when exposed to light. A portable solar panel is designed to provide a convenient and renewable power source for various portable electronic devices, such as a solar-powered asset tracker. The electric energy generated by the solar panel may be used to charge a rechargeable battery and/or power the various components of a solar-powered asset tracker, as will be described in detail below. Common types of portable solar panels for portable electronic devices include monocrystalline solar panels, polycrystalline solar panels, and thin-film solar panels. Monocrystalline solar panels use a single silicon crystal per photovoltaic cell, while polycrystalline solar panels use multiple silicon crystals melted together per photovoltaic cell. Thin-film solar cells are made by depositing one or more thin layers of photovoltaic material onto a substrate, such as glass, plastic, or metal.

A rechargeable battery is a type of battery that can be charged and discharged multiple times making it reusable. Rechargeable batteries can be recharged, using electrical energy, to restore their energy storage capacity for future use. A rechargeable battery may be of any of the following types of rechargeable batteries: Nickel-Cadmium (Ni—Cd), Nickel-Metal Hydride (NiMH), Lithium-Ion (Li-ion), or Lithium Polymer (LiPo). Ni—Cd batteries are less common since they have a relatively low energy density compared to other rechargeable battery types, and because they suffer from the memory effect. NiMH batteries have better energy density than Ni—Cd batteries but still suffer from the memory effect. Li-ion batteries are widely used as they have a higher energy density than Ni—Cd and NiMH, and have no memory effect. Variants of Li-ion batteries include Lithium Cobalt Oxide (LiCoO2), Lithium Iron Phosphate (LiFePO4), Lithium Nickel Manganese Cobalt Oxide (Li—NMC), and Lithium Nickel Cobalt Aluminum Oxide (Li—NCA). LiPo batteries Pouch Cell LiPo batteries and Cylindrical Cell LiPo batteries.

A non-limiting embodiment of a solar-powered electronic device powered by is described below in the form of a solar-powered asset tracker operating in the context of an asset tracking system.

Asset Tracking System

An asset tracking system facilitates tracking and monitoring the location, movement, and condition of various assets. An asset tracking system may be used in logistics, transportation, supply chain management, and other industries. Asset trackers are devices that are coupled with assets to track and monitor the location, movement, and condition of the assets. An asset may be a vehicle, a valuable piece of equipment, a shipping container, a trailer, a tank, or any other type of asset whose location, movement, and condition need to be tracked. The asset tracker is an electronic device that contains at least one of a location module, an inertial measurement unit, and one or more sensors. The location module determines the location of the asset tracker, and hence the location of the asset. The inertial measurement unit detects motion, orientation, and heading. The one or more sensors determine the conditions experienced by the asset tracker, such as temperature, pressure, noise, and the like. The asset tracker periodically communicates the location, movement, and/or conditions thereof to a remote server, such as an asset tracking server. Accordingly, the location, movement, and/or condition of the asset may be tracked in real-time or near real-time.

FIG. 1 shows a high-level block diagram of an asset tracking system 101. The asset tracking system 101 includes an asset tracker 200 deployed in an asset 100, a network 50, an asset tracking server 130, an administration terminal 140, and satellites 170. While a single instance of each element is shown for simplicity, multiple instances of each shown element are typical in an asset tracking system.

The asset 100 shown is in the form of a shipping container placed on a trailer 105 coupled to a tractor 110. The asset 100 may be a shipping container, a vehicle, industrial equipment, construction equipment, a tank holding a chemical, or any other asset whose location, movement, and/or condition needs to be tracked. The asset 100 may be transported by a trailer 105 as shown, or may be transported by a ship, a train, an airplane, or any other means of transportation. The asset 100 may also be a piece of industrial or construction equipment, such as a generator, a concrete mixer, a compressor, and the like. Such types of assets may have wheels and may be towed from one site to another.

The asset tracker 200 is an electronic device couplable to an asset, such as the asset 100. The asset tracker 200 is configured to track the location, movement, and/or condition of the asset 100. The asset tracker 200 may be battery-powered or solar-powered. A battery-powered asset tracker is an electronic asset tracker powered by a non-rechargeable battery. A solar-powered asset tracker is powered by a solar panel and a rechargeable battery. A detailed description of the internal components of a solar-powered asset tracker 300 are described with reference to FIG. 3, in accordance with embodiments of the present disclosure. The solar-powered asset tracker 300 is an example of a solar-powered electronic device powered by a rechargeable battery and a solar panel. The asset tracker 200 utilizes a Global Navigation Satellite System (GNSS) to obtain the location thereof. In the depicted embodiment, the asset tracker 200 is in communication with the satellites 170 to obtain the location thereof. The asset tracker 200 also contains an inertial measurement unit (IMU) and/or sensors such as temperature, light, and pressure sensors. The combination of location data, movement, and sensor data are termed asset tracking data 112. The asset tracker 200 connects to a network 50 which allows the asset tracker 200 to send the asset tracking data 112 to a remote server such as the asset tracking server 130.

The network 50 may be a single network or a combination of networks such as a data cellular network, a wide area network, the Internet, and other network technologies. The network 50 provides connectivity between the asset tracker 200 and the asset tracking server 130, and between the administration terminal 140 and the asset tracking server 130.

In some implementations of the asset tracking system 101, the network 50 is a cellular network utilizing cellular technology. In one implementation, the network 50 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network 50 uses the Third-generation (3G) cellular technology utilizing the Universal Mobile Telephone System (UMTS) supporting data transfer using the High Speed Packet Access (HSPA) protocol. In yet another implementation, the network 50 uses the Fourth-generation cellular technology (4G) which uses the Long Term Evolution (LTE) protocol. In another implementation, the network 50 uses the Fifth-generation (5G) cellular technology. In yet another implementation, the network 50 uses the Narrowband Internet of Things (NB-IoT) which is a low-power wide-area network (LPWAN) technology that is part of the Third Generation Partnership Project (3GPP) standard.

In some implementations of the asset tracking system 101, the network 50 comprises a Wide Area Network (WAN) using non-cellular WAN technologies. One example of a non-cellular WAN technology that the network 50 can use is the Worldwide Interoperability For Microwave Access (WiMAX™) which is based on the IEEE 810.16 family of standards. Another example of a non-cellular WAN technology that the network 50 may use is Long Range Wide Area Network (LoRaWAN™) technology which is a low-power WAN protocol. Yet another example of a non-cellular WAN technology that the network 50 may use is Weightless which is a family of open standard low-power WAN (LPWAN) technology that operate in the sub-GHz frequency bands.

In some implementations of the asset tracking system 101, the network 50 uses a wired network technology when the asset tracker 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

In some implementations, the network 50 is a combination of the above-specified technologies.

The asset tracking server 130 is an electronic device capable of executing machine-executable programming instructions for receiving, storing, and analyzing the asset tracking data 112. The asset tracking server 130 may be implemented as a single computer system or a cluster of computers. The asset tracking server 130 may utilize an operating system such as Linux, Windows, Unix, FreeBSD, macOS Server, VMware ESXI, Microsoft Hyper-V Server, Oracle Solaris, IBM AIX, or any other equivalent operating system. Alternatively, the asset tracking server 130 may be implemented on a cloud computing platform, such as Amazon Web Service (AWS), Microsoft Azure, Google Cloud Platform (GCP), IBM Cloud, Oracle Cloud, and Alibaba Cloud. The asset tracking server 130 is connected to the network 50 and may receive asset tracking data 112 from the asset tracker 200. The asset tracking server 130 may have a plurality of software modules for performing data analysis and analytics on the telematics data to obtain useful asset information about the assets 100. The asset tracking server 130 may be coupled to an asset tracking database 132 for storing telematics data and/or the results of the analytics which are related to the asset 100. The asset tracking server 130 may communicate the asset tracking data 112 pertaining to the asset 100 to the administration terminal 140.

The satellites 170 may be part of a global navigation satellite system (GNSS) which is a satellite-based navigation system that provides positioning, navigation, and timing services worldwide. The four primary GNSS systems in operation today are Global Positioning System (GPS), Global Navigation Satellite System (GLONASS), Galileo, and BeiDou. GPS was developed and operated by the United States, GLONASS is the Russian counterpart of GPS, Galileo is the European Union's GNSS, and BeiDou is the Chinese GNSS system. Other less commonly used GNSS systems are QZSS (Japan) and IRNSS or NavIC (India). The location information may be processed by a location module on the asset tracker 200 to provide location data indicating the location of the asset tracker 200 (and hence the location of the asset 100 coupled thereto). In other implementations (not shown), the asset tracker 200 may use other means to determine the location thereof as outlined below.

The administration terminal 140 is an electronic device capable of connecting to the asset tracking server 130, over the network 50. The administration terminal can be configured to retrieve data and analytics related to one or more assets 100; to receive alerts from the asset tracking server 130 in respect of one or more conditions on the asset tracker 200; or to issue commands to one or more asset tracker 200 via the asset tracking server 130. The administration terminal 140 is shown as a laptop computer, however, this is not necessarily the case. An administration terminal may be a desktop computer, an industrial human-machine interface (HMI), a touch screen panel, a table, a smartphone, an Augmented Reality (AR) headset, or a Network Operations Center (NOC). The administration terminal 140 may run a web browser or a custom application which allows retrieving data and analytics, pertaining to one or more assets 100, from the asset tracking server 130 via a web interface of the asset tracking server 130. The administration terminal 140 may also be used to issue commands to one or more asset tracker 200 via the asset tracking server 130. An administrator 11 may communicate with the asset tracking server 130 using the administration terminal 140. In addition to retrieving data and analytics, the administration terminal 140 allows the administrator 11 to set alerts and geofences for keeping track of the assets 100, receiving notifications of deliveries, and so on.

In operation, an asset tracker 200 is coupled to an asset 100 to capture the asset's location, motion and/or one or more conditions pertaining to the asset. The location data is determined by a location module in communication with the satellites 170. The motion data is determined by an inertial measurement unit that is part of the asset tracker 200 or coupled thereto. The one or more conditions are determined from sensor data gathered from sensors in the asset tracker 200 or external sensors coupled to the asset tracker 200. The combination of location data, motion data, and/or sensor data comprises the asset tracking data 112. The asset tracker 200 sends the asset tracking data 112 to the asset tracking server 130 over the network 50. The asset tracking server 130 may process, aggregate, and analyze the asset tracking data 112 to generate asset information pertaining to the asset 100. The asset tracking server 130 may store the asset tracking data 112 and/or the generated asset information in the asset tracking database 132. The administration terminal 140 may connect to the asset tracking server 130, over the network 50, to access the asset tracking data 112 and/or the generated asset information. Alternatively, the asset tracking server 130 may push the asset tracking data 112 and/or the generated asset information to the administration terminal 140. An administrator 11 may use the administration terminal 140 to set alerts for certain activities pertaining to the assets 100. When criteria for an alert is met, the asset tracking server 130 sends a message to the administration terminal 140 to notify the administrator 11. For example, when an asset is moved outside of a service area the asset tracking server 130 may send an alert message to the administration terminal 140. An administrator 11 may also use the administration terminal 140 to configure an asset tracker 200 by issuing commands thereto via the asset tracking server 130. For example, the asset tracking server 130 may issue a command to the asset tracker 200 to capture certain types of sensor data in response to certain conditions.

Solar-powered Asset Tracker

As an example of an electronic device powered by a rechargeable battery and a solar panel, a solar-powered asset tracker 300 is described with reference to FIG. 2 and FIG. 3.

Figure 3:
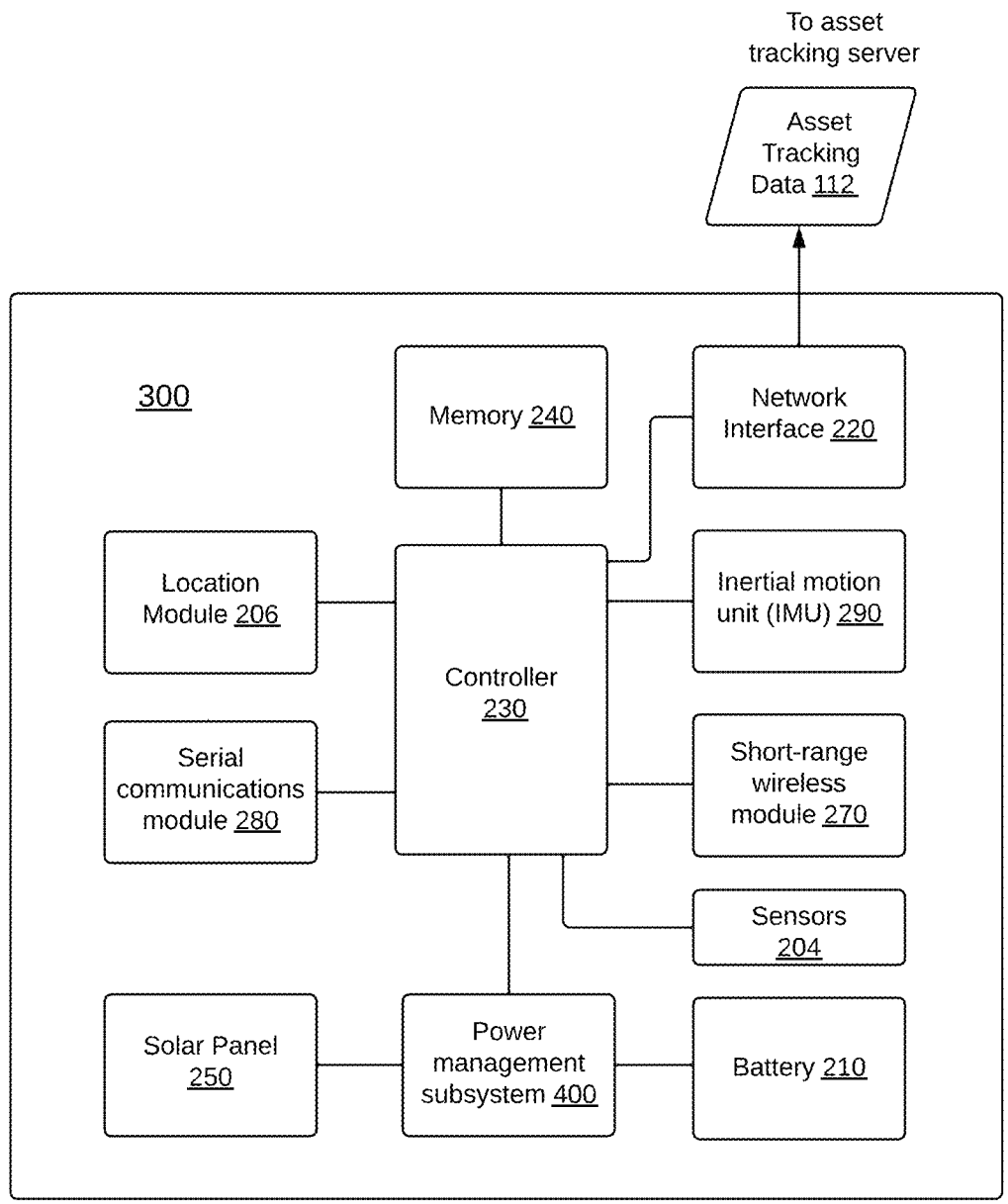
FIG. 3 is a block diagram of an exemplary electronic device in the form of a solar-powered asset tracker.

FIG. 3 is a perspective view of a solar-powered asset tracker 300, in accordance with embodiments of the present disclosure. The solar-powered asset tracker 200 has a housing 202 for housing the internal components of the asset tracker 200. On the top surface 203 of the housing 202, there is a solar panel 250 acting as an energy harvester for the solar-powered asset tracker 300. When deployed, the solar-powered asset tracker 300 is coupled to an asset and located for optimal exposure to sunlight. For example, a solar-powered asset tracker 300 is typically attached to a top surface of the asset so as to have exposure to direct sunlight.

FIG. 3 is a block diagram of a solar-powered asset tracker 300, in accordance with embodiments of the present disclosure. The solar-powered asset tracker 300 is an example of a solar-powered electronic device.

The solar-powered asset tracker 300 includes a controller 230. A plurality of peripherals are coupled to the controller 230 by different types of interfaces. The peripherals include a memory 240, a network interface 220, an IMU 290, a short-range wireless communications module 270, sensors 204, a location module 206, and a serial communications module 280. The solar-powered asset tracker 300 also includes a solar panel 250 and a rechargeable battery 210. A power management subsystem 400 couples the solar panel 250 to the rechargeable battery 210, the controller 230, and the peripherals. Some of the peripherals shown may be optional as will be discussed below.

The controller 230 may include one or any combination of a processor, a microprocessor, a microcontroller (MCU), a central processing unit (CPU), a System-on-Chip (SOC), a processing core, a state machine, a logic gate array, an application-specific integrated circuit (ASIC), a field-programmable gate array (FPGA), or any other hardware component or combination of hardware components capable of executing machine-executable programming instructions. The controller 230 may follow a Von Neumann Architecture, a Harvard Architecture, or a Modified Harvard Architecture. The controller 230 may be a Complex Instruction Set Computer (CISC) processor supporting a complex instruction set that can perform multiple operations in a single instruction. Alternatively, the controller 230 may be a Reduced Instruction Set Computer (RISC) processor having a simplified and streamlined instruction set, and employs a pipeline architecture to optimize execution. The controller 230 may have a single processor core or multiple processor cores supporting parallel execution of instructions. The controller 230 may have an internal memory for storing machine-executable programming instructions to be executed by the controller 230 to carry out the steps of the methods described in this disclosure.

The memory 240 is an electronic storage component that enables storage of data and machine-executable programming instructions. The memory 240 may be a read-only-memory (ROM) including a Programmable ROM (PROM), and Erasable Programmable ROM (EPROM), Electrically Erasable Programmable ROM (EEPROM), or Flash memory. The memory 240 may be a random access memory (RAM) including Static RAM (SRAM) and Dynamic RAM (DRAM). Alternatively, the memory 240 may be a Ferroelectric RAM (FRAM), a Magnetic Random Access Memory (MRAM), or a Phase-Change Memory (PCM). The memory 240 may also be any combination of the aforementioned types. The memory 240 is for storing machine-executable programming instructions and/or data to support the functionality described in this disclosure. The memory 240 is coupled to the controller 230, via a memory bus, thus enabling the controller 230 to execute the machine-executable programming instructions stored in the memory 240 and to access the data stored therein.

The location module 206 provides the location of the asset tracker 200. In some implementations, the location module 206 is a Global Navigation Satellite Systems (GNSS) transceiver using one or more of the above-mentioned GNSS technologies. In other implementations, the location module 206 determines the location of the solar-powered asset tracker 300 from a cellular network using cell tower triangulation. In this case, the location module 206 is coupled with the network interface 220, which in this case is a cellular modem, for receiving signal measurements from multiple nearby cell towers. The location module 206 uses the signal measurements to estimate the location of the solar-powered asset tracker 300. The location information determined by the location module 206 is sent to the controller 230. The location data may be in the form of a latitude and longitude or in Universal Transverse Mercator (UTM) coordinates.

The sensors 204 may be one or more of: a temperature sensor, a pressure sensor, an optical sensor, a humidity sensor, a gas sensor, an acoustic sensor, a pH sensor, a soil moisture sensor, or any other suitable sensor indicating a condition pertaining to the asset 100 to which the solar-powered asset tracker 300 is coupled. The sensors 204 are coupled to the controller via any one of serial, parallel, or bus technologies. For example, some of the sensors 204 may connect to the controller 230 via a parallel interface. Other sensors 204 may connect to the controller 230 via a bus using any one of the known bus technologies such as the Industry Standard Architecture (ISA), Extended ISA (EISA), Micro Channel Architecture (MCA), Video Electronics Standards Association (VESA), Peripheral Component Interconnect (PCI), PCI Express (PCI-X), Personal Computer Memory Card Industry Association (PCMCIA), Accelerated Graphics Port (AGP), and Small Computer Systems Interface (SCSI). The sensors 204 may connect to the controller via a serial link such as a Universal Asynchronous Receiver Transmitter (UART), Serial Peripheral Interface (SPI), or Inter-Integrated Circuit (I2C). The sensors 204 provide sensor data to the controller 230. Some asset trackers may not have any sensors 204 and may only provide location information and/or IMU information. Some asset trackers may have the capability of pairing with external sensors via a wired or a wireless interface.

The IMU 290 is an inertial measurement unit. The IMU 290 is a device used to measure and provide information about the asset tracker's motion, orientation, and acceleration. The IMU 290 may be comprised of several components working together. For example, the IMU 290 may be comprised of one or more accelerometer, a gyroscope, a magnetometer, and a barometer. An accelerometer measures linear acceleration in three axes (typically X, Y, and Z). A gyroscope measures the angular velocity or rate of rotation around each of the three axes. A magnetometer measures the strength and direction of a magnetic field and thus determines the heading or orientation relative to the Earth's magnetic field. A barometer measures the atmospheric pressure and that can be used to estimate changes in altitude. Some IMUs contain a microcontroller or a processor that runs sensor fusion algorithms to combine and process the data from the various above-mentioned sensors. Other IMUs contain a communication interface to interface with an external microcontroller or processor. Some asset trackers may not contain an IMU unit and may report motion determined from the change in location reported by the location module 206. The IMU 290 may communicate with the controller via a parallel interface, a serial interface using any one of the above-mentioned serial technologies, a bus interface using any one of the above-mentioned bus technologies, or may connect directly to General Purpose Input/Output (GPIO) and interrupt pins of the controller 230.

In some implementations, the network interface 220 includes a cellular modem utilizing cellular technology. In one implementation, the network interface 220 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network interface 220 uses the Third-generation (3G) cellular technology utilizing the Universal Mobile Telephone System (UMTS) supporting data transfer using the High Speed Packet Access (HSPA) protocol. In yet another implementation, the network interface 220 uses the Fourth-generation cellular technology (4G) which uses the Long Term Evolution (LTE) protocol. In another implementation, the network interface 220 uses the Fifth-generation (5G) cellular technology. In yet another implementation, the network interface 220 uses the Narrowband Internet of Things (NB-IoT) which is a low-power wide-area network (LPWAN) technology that is part of the Third Generation Partnership Project (3GPP) standard.

In some implementations, the network interface 220 comprises a Wide Area Network (WAN) modem using non-cellular WAN technologies. The network interface 220 may use non-cellular WAN technologies. One example of a non-cellular WAN technology that the network interface 220 can use is the Worldwide Interoperability For Microwave Access (WiMAX™) which is based on the IEEE 810.16 family of standards. Another example of a non-cellular WAN technology that the network interface 220 may use is Long Range Wide Area Network (LoRaWAN™) technology which is a low-power WAN protocol. Yet another example of a non-cellular WAN technology that the network interface may use is Weightless which is a family of open standard low-power WAN (LPWAN) technology that operate in the sub-GHz frequency bands.

In some implementations, the network interface 220 uses a wired network technology when the solar-powered asset tracker 300 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

The network interface 220 may be integrated into the controller or coupled thereto via a parallel interface, a serial interface using any one of the above-mentioned serial technologies, a bus interface using any one of the above-mentioned bus technologies, or may connect directly to General Purpose Input/Output (GPIO) and interrupt pins of the controller 230.

The network interface 220 is used to transmit the asset tracking data 112 to the asset tracking server 130 over the network 50. The network interface 220 may also be used to receive instructions from the asset tracking server 130 for configuring the solar-powered asset tracker 300 in a certain mode and/or requesting a particular type of the asset tracking data 112 from the asset 100.

The short-range wireless communications module 270 is a component intended for providing short-range wireless communication capability to the solar-powered asset tracker 300. The short-range wireless communications module 270 comprises at least one of a Bluetooth™ module, a wireless fidelity (Wi-Fi™) module, a Zigbee™ module, a Near Field Communication (NFC™) module, a Z-Wave module, and a Radio Frequency Identification (RFID™). Alternatively, the short-range wireless communications module 270 comprises any other short-range wireless communications module. Bluetooth is a widely used wireless technology for short-range communication between devices. Bluetooth operates in the 2.4 GHz frequency band and supports different versions with varying data rates and ranges. Wi-Fi is a wireless communication technology commonly used for local area network (LAN) connectivity. Wi-Fi operates in different frequency bands, including 2.4 GHz and 5 GHz, and offers higher data rates compared to Bluetooth. NFC is a short-range wireless communication technology that enables devices to establish communication by bringing them close together, typically within a few centimeters. Zigbee is a low-power wireless communication protocol designed for short-range communication in wireless sensor networks, which operates on the IEEE 810.15.4 standard. Z-Wave is a wireless communication technology that operates in the sub-GHz frequency range, allowing for longer range and better penetration through walls compared to some other wireless technologies. RFID is a technology that uses electromagnetic fields to identify and track objects or individuals wirelessly. It consists of tags or labels that store data and readers that transmit and receive signals to interact with the tags. The short-range wireless communications module 270 allows other devices to communicate with the solar-powered asset tracker 300 over a short-range wireless network. For example, external wireless sensors may send sensor data to the solar-powered asset tracker 300 via the short-range wireless communications module 270.

The serial communications module 280 is an example of a wired communications module. The serial communications module 280 is an electronic peripheral for providing serial wired communications to the solar-powered asset tracker 300. For example, the serial communications module 280 may be one of a Universal Asynchronous Receiver Transmitter (UART), a Serial Peripheral Interface (SPI), an Inter-Integrated Circuit (I2C) module, a Controller Area Network (CAN) transceiver, or an RS-232 transceiver. A UART enables synchronous data transmission between devices and supports relatively low data rates. SPI is a synchronous serial communication protocol that allows devices to exchange data in full-duplex mode. I2C is a serial communication protocol that enables devices to communicate using a two-wire interface. CAN is a serial communication bus commonly used in automotive and industrial applications. In some examples, the serial communications module 280 allows an external device to connect with the solar-powered asset tracker 300 for downloading asset tracking data 112 therefrom. In other examples, the serial communications module allows external sensors to send sensor data to the solar-powered asset tracker 300.

The rechargeable battery 210 is used to power the solar-powered asset tracker 300 in conjunction with the solar panel 250. Rechargeable batteries are energy storage devices that can be reused multiple times by recharging them after they have been depleted. Rechargeable batteries offer a more sustainable and cost-effective alternative to disposable, single-use batteries. Since a solar-powered asset tracker 300 may be deployed in the field for months or even years, and can be recharged by a solar panel, the use of a rechargeable battery is appropriate. The use of a rechargeable battery averts the need to access the asset tracker to frequently or periodically replace a non-rechargeable battery. The rechargeable battery 210 may be of any of the above-mentioned rechargeable battery technologies.

Figure 2:
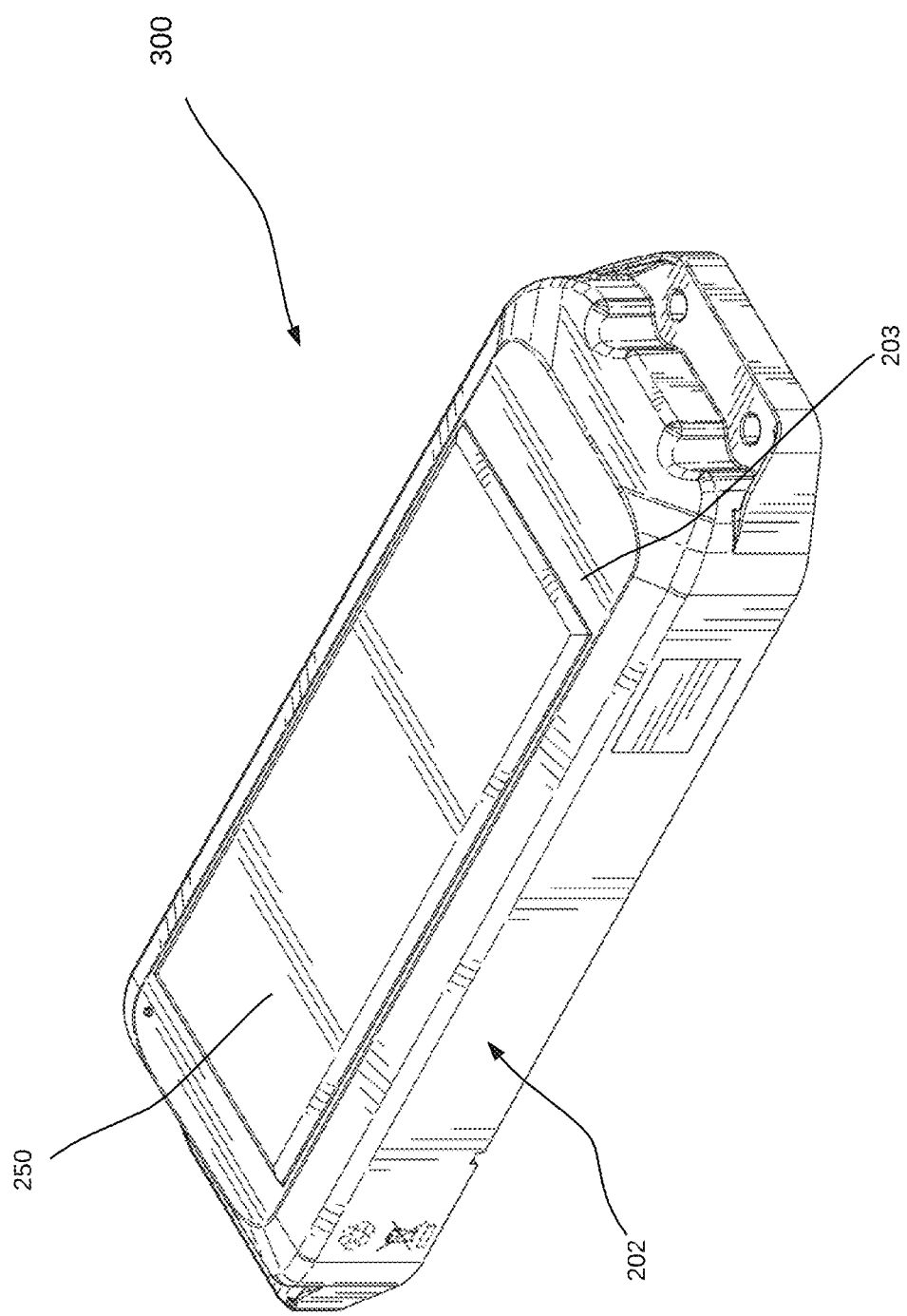
FIG. 2 is a perspective view of an exemplary electronic device in the form of a solar-powered asset tracker.

The solar panel 250 is a portable solar panel disposed, as shown on FIG. 2, on top of the housing 202 of the solar-powered asset tracker 300. The solar panel 250 may be of any one of the above-mentioned solar panel types. The solar panel 250 is coupled to the rechargeable battery 210 and the peripherals of the solar-powered asset tracker 300 via the power management subsystem 400.

The power management subsystem 400 is a subsystem composed of a plurality of electronic components that are utilized to control the operation of the rechargeable battery 210 and the solar panel 250 for optimal operation and longevity of the solar-powered asset tracker 300 as will be described in further details below.

In operation, the controller 230 may receive one or more of: sensor data from the sensors 204, location data from the location module 206, motion and/or orientation data from the IMU 290, and other data from the short-range wireless communications module 270 or the serial communications module 280. Collectively, the gathered data comprises the asset tracking data 112. The controller 230 transmits the asset tracking data 112 to the asset tracking server 130 over the network 50 via the network interface 220.

In some implementations, the solar-powered asset tracker 300 receives, via the network interface 220, commands from the asset tracking server 130 over the network 50. The received commands instruct the asset tracker 200 to be configured in a particular way. For example, the received commands may configure the way in which the solar-powered asset tracker 300 gathers asset tracking data 112.

Problems with Traditional Solar-Powered Electronic Devices

In a traditional solar-powered electronic device, when solar energy is available, the solar panel 250 generates electric energy that is used to charge the rechargeable battery 210. When solar energy is unavailable or low, the rechargeable battery 210 powers the various components of the solar-powered asset tracker 300. The inventors have identified a number of problems with traditional solar-powered electronic devices.

In a traditional solar-powered electronic device, the solar-powered electronic device and its peripherals are powered by the rechargeable battery at all times. Accordingly, the solar panel is connected to the rechargeable battery. When solar light falls on the solar panel, the solar panel produces electric energy which charges the rechargeable battery. When no or low solar light is falling on the solar panel, the solar-powered electronic device runs off of the rechargeable battery. A typical arrangement has a serial switch that connects the solar panel to the rechargeable battery when the rechargeable battery needs charging. Otherwise, the serial switch is open. There are a number of problems that a traditional solar-powered electronic device encounters as a result of the aforementioned power arrangement.

One problem with a traditional power-management arrangement in a solar-powered electronic device is the failure to report a dead battery for replacement in a timely manner. In the example of the solar-powered asset tracker 300, the solar-powered asset tracker 300 has a network interface 220 and is able to send messages to the asset tracking server 130. However, if the solar-powered asset tracker 300 was running off the rechargeable battery 210 and the rechargeable battery 210 fails, the solar-powered asset tracker 300 will stop working. An administrator 11 will not know the real cause the solar-powered asset tracker 300 has ceased to send any asset tracking data 112. As will be presented below, the present disclosure overcomes this problem by detecting the failed rechargeable battery condition and powering the solar-powered asset tracker 300 from the solar panel 250. Advantageously, the solar-powered asset tracker 300 is able to operate and send a message to the asset tracking server 130 reporting the failed rechargeable battery condition. As a result, administrator 11 is informed of the need to replace the rechargeable battery 210.

Another problem with the traditional power arrangement in a solar-powered electronic device is the unnecessary charging and discharging of the rechargeable battery. As is known in the art, a rechargeable battery's life is reduced by the number of discharge/recharge cycles that the rechargeable battery is subjected to. In a traditional arrangement, even if there is solar light falling on the solar panel, the solar-powered electronic device still operates from the rechargeable battery. This causes the rechargeable battery to discharge and is subsequently recharged by the solar panel. As a result, the life of the rechargeable battery is reduced and the rechargeable battery eventually dies prematurely. When the rechargeable battery dies, the solar-powered electronic device needs to be replaced or at least undergo maintenance to replace the rechargeable battery thus causing a disruption in the operation of the solar-powered electronic device. For a solar-powered asset tracker deployed in the field, the disruption of service relating to replacement of the battery or of the asset tracker can lead to the case where the asset tracking data 112 is no longer being delivered. As a result, assets may be misplaced or lost without the knowledge of an administrator 11. The cost of maintaining or replacing the solar-powered asset tracker is another consideration. In the present disclosure, the problem of rechargeable battery life reduction due to the repetitive discharging/recharging thereof is solved by disconnecting a rechargeable battery 210 that is fully charged, from the solar panel 250 and powering the solar-powered asset tracker 300 from the solar panel 250 as long as the solar panel 250 can provide enough electric energy for the operation of the solar-powered asset tracker 300. Advantageously, the number of discharge/recharge cycles of the rechargeable battery 210 is reduced thereby increasing the longevity of the rechargeable battery 210. As a result, the solar-powered asset tracker 300, or any other solar-powered electronic device, can operate for longer periods without the need for maintenance or replacement.

When the solar-powered asset tracker 300 is powered by the solar panel 250 only (because the rechargeable battery 210 is fully charged and has been disconnected), situations arise when the electric power delivered by the solar panel 250 is insufficient to power certain peripherals, such as the network interface 220. In such cases, the power management subsystem 400 is configured, by the controller 230, to temporarily engage the rechargeable battery 210 to perform certain functions that require higher electrical power than the solar panel 250 can deliver.

Yet another problem that may be encountered in a traditional power arrangement in a solar-powered device is the draining of the rechargeable battery 210 through the solar panel 250 when the solar panel 250 is not generating any electric energy, such as at nighttime or in dark areas such as tunnels. Draining of the rechargeable battery 210 through the solar panel 250 degrades the cells of the solar panel 250 thus reducing the lifetime thereof. In this disclosure, when the solar panel 250 is not generating any electric energy, the solar panel 250 is disconnected such that the rechargeable battery 210 does not drain through the solar panel. Advantageously, the degradation of the solar panel 250 is reduced and the solar-powered asset tracker 300 can operate for longer durations in the field without the need for maintenance or for solar panel replacement.

As mentioned above, the power management subsystem 400 of the asset tracker 200 is comprised of a plurality of components. Some of the plurality of components are discrete components while others are integrated circuits (ICs) as will be described below. A simplified block diagram of the power management subsystem 400 is shown in FIG. 4.

Figure 4:
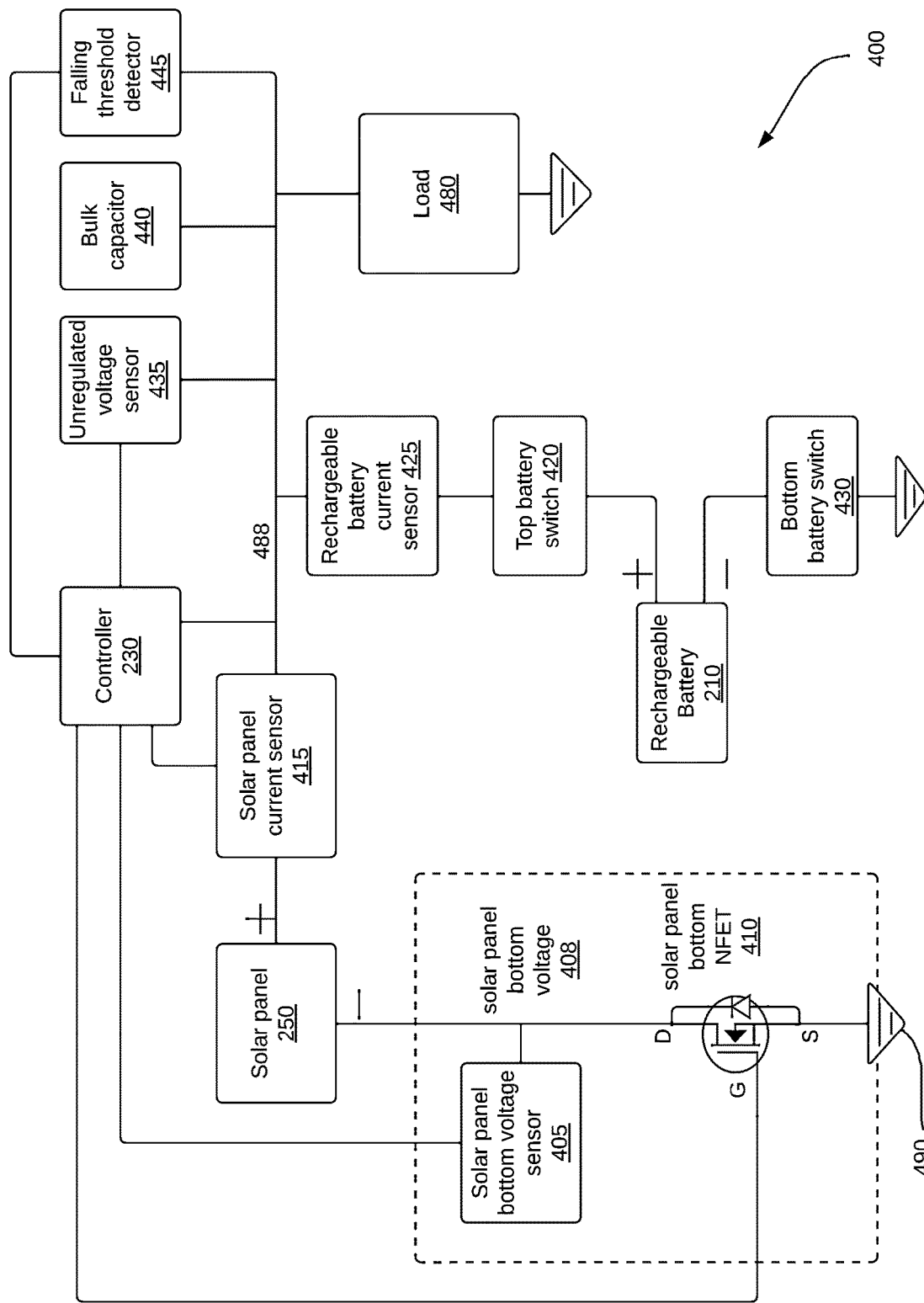
FIG. 4 is a block diagram showing the individual components of a power management module of the solar-powered asset tracker of FIG. 3 shown in conjunction with a controller, a solar panel, and a rechargeable battery, in accordance with embodiments of the present disclosure.

FIG. 4 depicts the solar panel 250, the rechargeable battery 210, and the controller 230 in conjunction with the various components of the power management subsystem 400, in accordance with embodiments of the present disclosure. The power management subsystem 400 is comprised of a solar panel bottom voltage sensor 405, a solar panel bottom Field Effect Transistor (FET) switch 410, a solar panel current sensor 415, a rechargeable battery current sensor 425, a top battery switch 420, a bottom battery switch 430, an unregulated voltage sensor 435, a bulk capacitor 440, and a falling threshold detector 445. The peripherals of the solar-powered asset tracker 300 are represented by the load 480. For example, the load 480 represents one or more of the sensors 204, the location module 206, the IMU 290, the network interface 220, the short-range wireless communications module 270, and the serial communications module 280. A description of the individual components and their function are given below.

Figure 6:
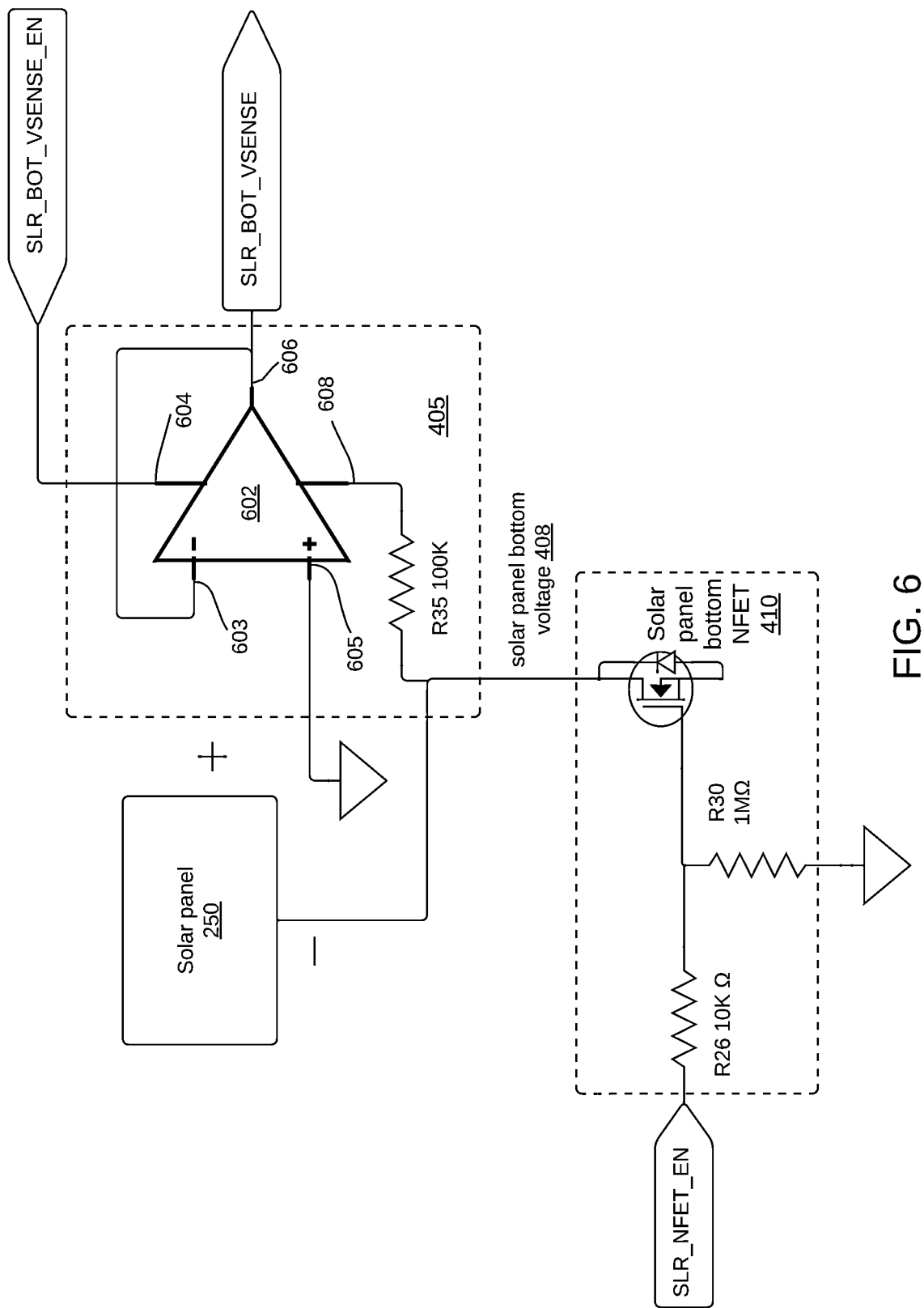
FIG. 6 is a schematic showing an implementation of a solar panel bottom voltage sensor and a solar panel bottom switch, in accordance with embodiments of the present disclosure.

The solar panel bottom voltage sensor 405 is connected at one end thereof to the negative terminal of the solar panel 250, and connected at another end thereof to the solar panel bottom FET switch 410. The solar panel bottom voltage sensor 405 measures a solar panel voltage representing the voltage at the negative terminal of the solar panel 250 ("solar panel bottom voltage 408"). As will be explained below, the solar panel bottom voltage 408 indicates whether the solar panel 250 is producing sufficient electric energy to power the peripherals of the solar-powered asset tracker 300. An implementation of the solar panel bottom voltage sensor 405 is shown in the schematic of FIG. 6.

The solar panel bottom FET switch 410 is an electronic switch that is used to connect/disconnect the solar panel 250 to/from the rechargeable battery 210 and the rest of the peripherals, which are represented by the load 480. For reasons provided below, the solar panel bottom FET switch 410 is implemented as such and not as a general electronic switch. As shown, the solar panel bottom FET switch 410 is implemented as an N-channel Field Effect Transistor (NFET). Hereinafter, the solar panel bottom FET switch 410 will be referred to as the solar panel bottom NFET 410. For the solar panel bottom NFET 410, the drain (D) is connected to the negative terminal of the solar panel 250 and the source (S) is connected to the ground terminal 490. The gate (G) is connected to an output pin of the controller 230 so that the controller can open or close the solar panel bottom NFET 410. When the solar panel bottom NFET 410 is closed, current can flow therethrough. When the solar panel bottom NFET 410 is open, current cannot flow from the drain to the source, but may flow from the source to the drain through what is known as the body diode shown between the source and the drain. As will be described below, this feature of the NFET allows detecting whether the solar panel 250 is producing electrical energy or not. It should, however, be noted that a P-channel Field Effect Transistor (PFET) would also work if connected with the source thereof connected to the negative terminal of the solar panel 250 and the drain thereof connected to the ground terminal 490.

To illustrate how the solar-powered asset tracker 300 determines whether the solar panel 250 is producing sufficient electric energy, the following discussion considers the case when the solar panel bottom NFET 410 is closed and when the solar panel bottom NFET 410 is open.

Firstly, the case when the solar panel bottom NFET 410 is closed is discussed. When the solar panel 250 is providing sufficient electric power, electric current flows out of the positive terminal (+) of the solar panel 250 towards the rechargeable battery 210 and the other peripherals represented by the load 480. In this case, current flows from the ground into the solar panel 250 negative terminal (−). The solar panel bottom voltage 408 is 0V as the solar panel bottom voltage 408 point is connected to the ground. When the solar panel 250 is not providing sufficient electric power, electric current flows out of the rechargeable battery 210 into the positive terminal (+) of the solar panel 250, out of the negative terminal (−) of the solar panel 250, through the solar panel bottom NFET 410 to the ground. In this case the solar panel bottom voltage 408 is 0V as the solar panel bottom voltage 408 point is connected to the ground. The foregoing shows that with the solar panel bottom FET closed, the solar-powered asset tracker 300 cannot determine whether the solar panel is providing sufficient electric power.

Secondly, the case when the solar panel bottom NFET 410 is open is discussed. When the solar panel 250 is providing sufficient electric power, electric current flows out of the positive terminal (+) of the solar panel 250 towards the rechargeable battery 210 and the other peripherals represented by the load 480. In this case, current flows from the ground, through the body diode of the solar panel bottom NFET 410 into the solar panel 250 negative terminal (−). The body diode of the solar panel bottom NFET 410 causes a voltage drop of approximately 0.5V (junction diode voltage), and the solar panel bottom voltage 408 is approximately −0.5V. Conversely, when the solar panel 250 is not providing sufficient electric power, electric current flows out of the rechargeable battery 210 into the positive terminal (+) of the solar panel 250. However, the solar panel bottom NFET 410 does not allow current to pass from the drain (D) to the source (S) when the solar panel bottom NFET 410 is open. As such, the solar panel bottom voltage 408 is equal to the rechargeable battery voltage, which is a positive voltage such as 2.5V, 3.3V, 4.2V, or 5V.

Figure 5:
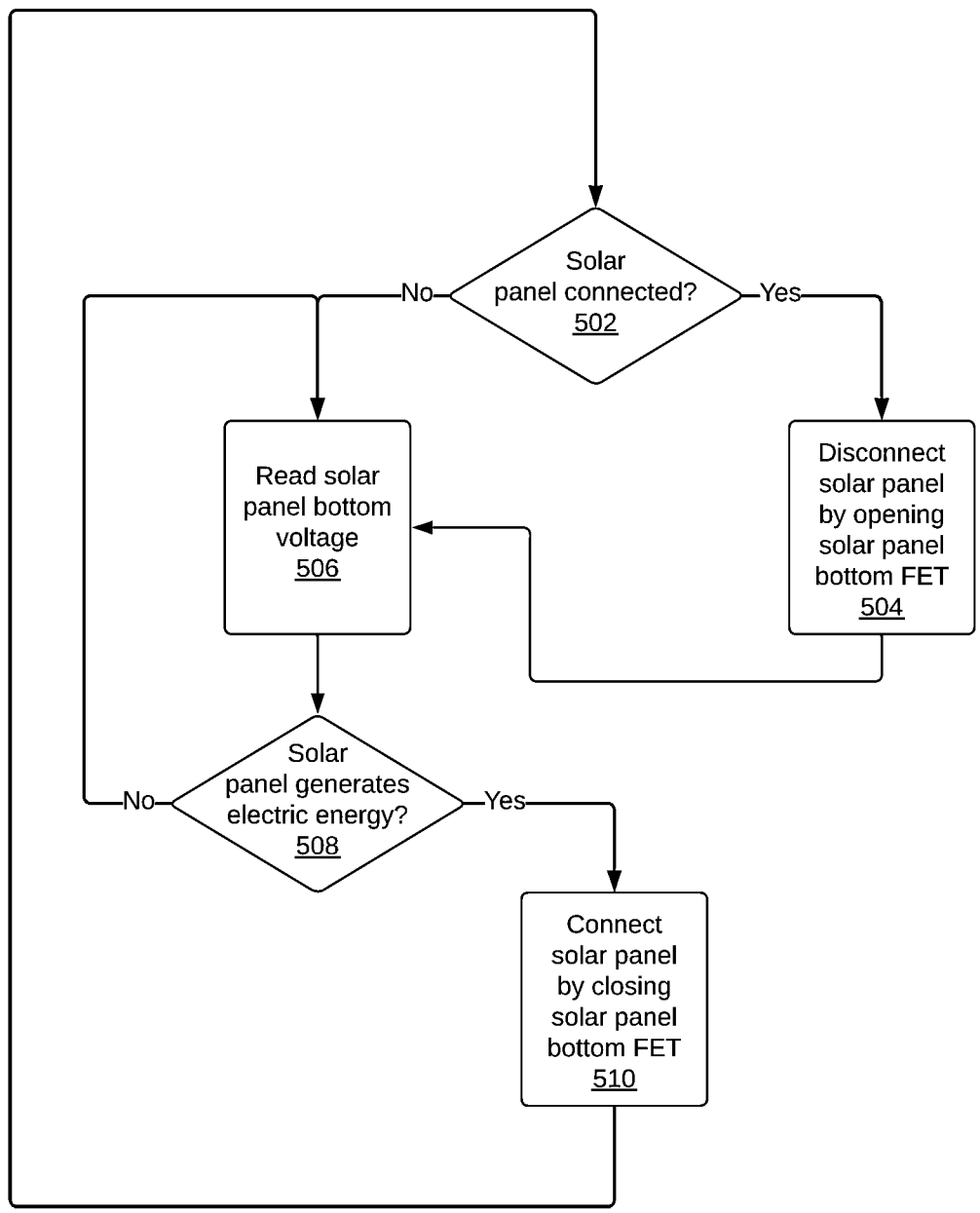
FIG. 5 is a flowchart of a method for controlling a solar panel in a solar-powered electronic device, in accordance with embodiments of the present disclosure.

In view of the above, it is noted that when the solar panel 250 is producing sufficient electric energy, the solar panel bottom NFET 410 needs to be closed so sufficient current flows from the solar panel 250 to power the load 480 and/or charge the rechargeable battery 210. It is also noted that for determining whether the solar panel 250 is determining sufficient electric energy, the solar panel bottom NFET 410 needs to be open and the solar panel bottom voltage 408 needs to be read. FIG. 5 depicts a method 500 by the solar-powered asset tracker 300 for controlling the solar panel 250 to prevent draining the rechargeable battery 210 through the solar panel 250 as discussed above.

The controller 230 of the solar-powered asset tracker 300 controls the solar panel bottom NFET 410. Specifically, machine-executable programming instructions (i.e., "firmware") executed by the controller 230 cause the controller to open or close the solar panel bottom switch via a signal connected to the gate (G) of the solar panel bottom NFET 410. Additionally, machine-executable programming instructions executed by the controller 230 keep track of the status of the solar panel bottom NFET 410. Accordingly, the solar-powered asset tracker 300 knows whether the solar panel 250 is connected to the ground or not.

At step 502, when the solar panel 250 is connected to the ground, control goes to step 504. If the solar panel 250 is not connected to the ground, then control goes to step 506.

At step 504, the solar-powered asset tracker 300 (via firmware executed by the controller 230) disconnects the solar panel 250 from the ground by opening the solar panel bottom NFET 410. This is done so that the controller 230 may read the solar panel bottom voltage 408 from the solar panel bottom voltage sensor 405. Control then goes to step 506.

At step 506, the solar-powered asset tracker the controller 230 reads the solar panel bottom voltage 408 from the solar panel bottom voltage sensor 405. As discussed above, the solar panel bottom voltage 408 indicates whether current is flowing from the solar panel 250 to the peripherals and the rechargeable battery 210 or flowing from the rechargeable battery 210 into the solar panel 250.

At step 508, the solar-powered asset tracker determines whether the solar panel 250 is generating sufficient electric energy. The direction of the current flow indicates whether the solar panel 250 is generating enough electrical energy or not. Specifically, a positive voltage value for the solar panel bottom voltage 408 indicates that current is flowing from the rechargeable battery 210 into the solar panel 250 and therefore the solar panel 250 is not generating sufficient electric energy to power the solar-powered asset tracker 300. In this case, the solar panel bottom NFET 410 is kept in the open state and the solar panel 250 remains disconnected.

At step 508, a negative voltage for the solar panel bottom voltage indicates that current is flowing out of the positive terminal of the solar panel 250 and from the ground, through the body diode of the solar panel bottom NFET 410 into the negative terminal of the solar panel 250. This indicates that the solar panel 250 generates sufficient electrical energy, and control goes back to 510.

At step 510, the solar-powered asset tracker 300 connects the solar panel 250 from the ground to allow the solar panel 250 to provide electric power to the load 480 and/or to recharge the rechargeable battery 210.

The method 500 may be executed periodically to check the status of the solar panel 250 and disconnect it if necessary. This is represented by the flow arrow between step 510 back to step 502. The method 500 may also be called by other methods for determining whether the solar panel 250 is generating sufficient electric energy to power the various peripherals of the electronic device.

Advantageously, the above method allows the solar-powered asset tracker 300 to detect the case when the rechargeable battery 210 is draining through the solar panel 250 due to the fact that the solar panel 250 is not capable of generating sufficient electric power. Additionally, the above method provides a way to disconnect the solar panel 250 from the rechargeable battery 210 to prevent draining of the rechargeable battery 210 through the solar panel 250 thus degrading the solar panel cells.

As discussed above, the solar panel bottom voltage 408 takes on a negative voltage value (e.g., −0.5V) if the solar panel 250 is producing sufficient electric energy, while the solar panel bottom NFET 410 is off. Conversely, the solar panel bottom voltage 408 takes on a positive voltage (e.g., 1.8V, 3.3V, 5V, etc.) when the solar panel 250 is not producing sufficient electric energy. Since the solar panel bottom voltage 408 may have a negative value or a positive value, such signal cannot be provided to an analog-to-digital converter (ADC) built into the controller 230 for determining whether the solar panel 250 is producing sufficient electric energy. Accordingly, the solar panel bottom voltage sensor 405 is configured to convert the solar panel bottom voltage to a positive-only signal. With reference to FIG. 6, there is shown an implementation of the solar panel bottom voltage sensor 405, in accordance with embodiments of the present disclosure.

In FIG. 6, the solar panel bottom NFET 410 is implemented as an NFET. The solar panel bottom NFET 410 is connected at the gate thereof to a solar panel switch enable signal (SLR_NFET_EN) through a resistor R26. The solar panel switch enable signal is connected to an output pin of the controller 230 so that the controller 230 may open or close the solar panel bottom NFET 410. Another resistor R30 connects the gate of the solar panel bottom NFET 410 to the ground. The solar panel bottom NFET 410 is connected at the source (terminal 2) thereof to the ground, and at the drain thereof to an implementation of the solar panel bottom voltage sensor 405.

The solar panel bottom voltage sensor 405 is implemented as an op amp 602. The output 606 of the op amp 602 is connected to the inverting input 603 thereof and outputs a solar panel bottom voltage sensor signal (SLR_BOT_VSENSE). The non-inverting input 605 of the op amp 602 is connected to ground. The positive supply terminal 604 of the op amp 602 is connected to a solar panel voltage sensor enable signal (SLR_BOT_VSENSE_EN). The negative supply terminal 608 of the op amp 602 is connected to the drain of the solar panel bottom NFET 410.

When the solar-powered asset tracker 300 needs to check the solar panel bottom voltage 408, firmware executed by the controller 230 de-asserts the signal SLR_NFET_EN thus putting the solar panel bottom NFET 410 in cut-off mode (i.e., switch is open, except for the conductivity through the body diode discussed above). With the solar panel bottom NFET 410 in cut-off mode, the firmware executed by the controller 230 asserts the signal SLR_BOT_VSENS_EN. At this point the output signal SLR_BOT_VSENSE of the op amp 602 of the solar panel bottom voltage sensor 405 outputs a positive analog signal that indicates whether the solar panel 250 is producing electrical energy or not. The output signal SLR_BOT_VSENSE takes a lower positive voltage value when the solar panel bottom voltage 408 is positive and takes a higher positive voltage value when the solar panel bottom voltage 408 is negative (i.e., −0.5V as discussed above because of the voltage drop between the ground and the body diode of the solar panel bottom NFET 410). The output signal SLR_BOT_VESNSE of the solar panel bottom voltage sensor 405 is input to an ADC channel of the controller 230.

The controller 230 executes firmware that periodically asserts the solar panel voltage sensor enable signal (SLR_

BOT_VSENSE_EN), and converts, using the ADC channel thereof, the solar panel bottom voltage sensor signal (SLR_BOT_VSENSE) to a digital value. The digital value determines whether the solar panel bottom voltage 408 is positive or negative. Accordingly, for cases where the solar panel bottom NFET 410 is open and the solar-powered asset tracker 300 is running off of the rechargeable battery 210, the solar-powered asset tracker is also able to connect the solar panel 250 back (by enabling the solar panel bottom NFET 410), when the solar-powered asset tracker 300 determines that the solar panel 250 is once again producing electrical energy. When the solar panel 250 is known not to be producing sufficient electrical energy, the controller 230 leaves the solar panel bottom NFET 410 open. In some implementations, the firmware executed by the controller 230 uses a periodic timer to periodically perform the aforementioned steps of asserting the solar panel voltage sensor enable signal (SLR_BOT_VSENSE_EN), converting the solar panel bottom voltage sensor signal (SLR_BOT_VSENSE), and comparing the digital value to determine whether the solar panel bottom voltage 408 is positive or negative.

Logging Solar Panel and Battery Charging and Discharging Currents

The asset tracker 200 needs to monitor and log parameters related to the current generated by the solar panel 250 and the charge/discharge current of the rechargeable battery 210. The solar panel current sensor 415 is a current sensing device that provides a digital value indicative of the current provided by the solar panel 250 at any given time. The rechargeable battery current sensor 425 indicates whether current is flowing into the rechargeable battery 210 (during charging) or flowing out of the rechargeable battery 210 (when the solar panel 250 is not providing electrical energy and thus the system is powered by the rechargeable battery 210). The magnitudes of the charging current (current flowing into the rechargeable battery 210) and the discharging current (current flowing out of the rechargeable battery 210) are both provided to the controller 230 and are tracked for metrics and analysis.

Solar Panel Current Sensor

Figure 7:
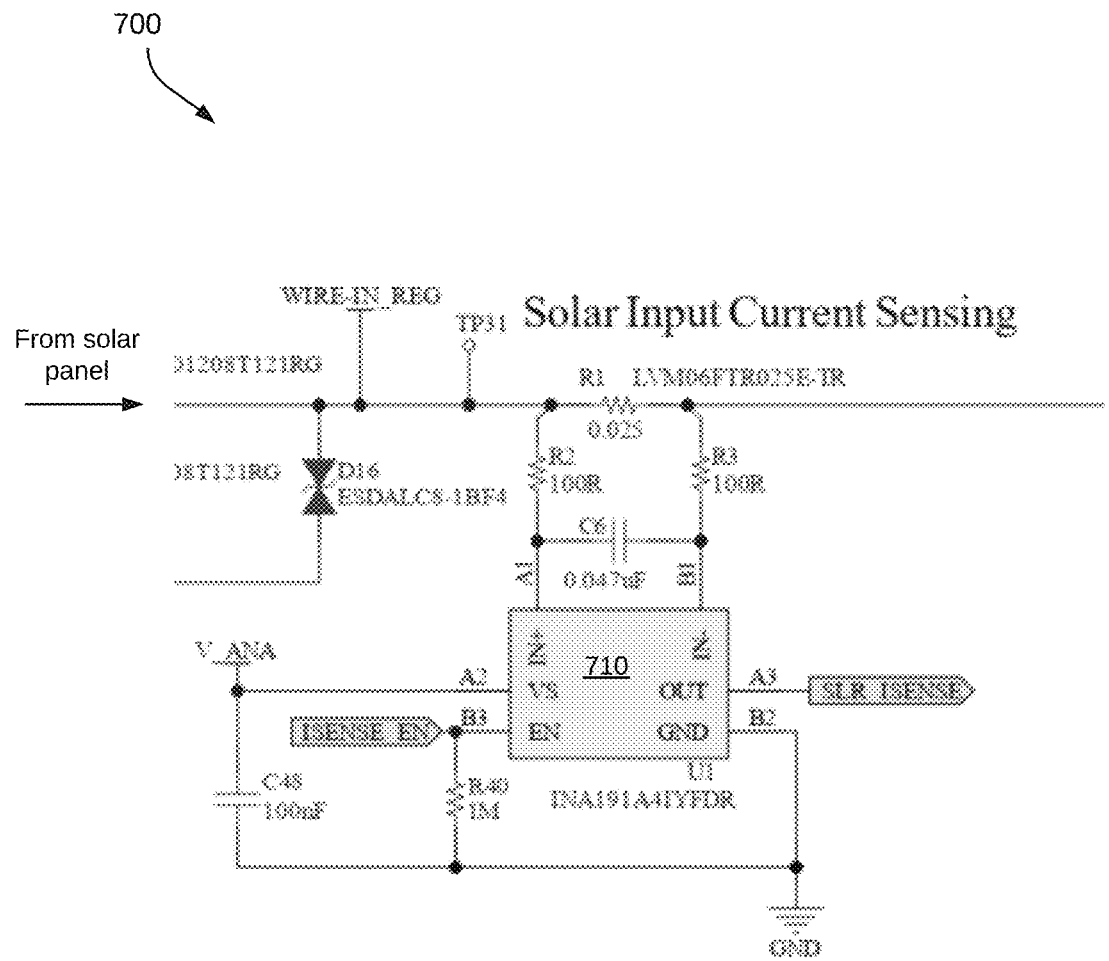
FIG. 7 is a schematic depicting an exemplary implementation of a solar panel current sensor circuit, in accordance with embodiments of the present disclosure.

In some implementations, the solar panel current sensor 415 is a current sense amplifier comprised of a shunt resistor, an operational amplifier ("op amp") to boost the voltage drop across the shunt resistor, and an ADC for converting the boosted voltage drop to a digital value representing the current supplied by the solar panel 250. In some implementations, the ADC is an integral part of the controller 230. In such cases, the solar panel current sensor may comprise a shunt resistor and an op amp. In some implementations, the solar panel current sensor 415 is one of: a differential amplifier, a zero drift amplifier, an instrumentation amplifier, a current sensing ADC, a current sensing transformer, a magnetic field sensor, and a transimpedance amplifier. In some embodiments, the solar panel current sensor 415 is an integrated circuit (IC) such as the INA191 current sense amplifier from Text Instruments™. As an example, FIG. 7 shows an implementation of a solar panel current sensor 700 as a current sense amplifier 710, which is an INA191 current sense amplifier. The shunt resistor R1 is connected to the signal line connected to the positive terminal of the solar panel 250. The current sense amplifier 710 measures the current flowing in the shunt resistor R1 via the two inputs thereof IN+ and IN−, through the resistors R2 and R3, respectively. The output pin (OUT) of the current sense amplifier 710 provides an indication of the current output by the solar panel 250 as the signal SLR_ISENSE. The current sense amplifier 710 is enabled by the solar panel current sensor enable signal (ISENSE_EN) which is connected to the enable (EN) pin of the current sense amplifier 710.

In operation, when the controller 230 executes machine-executable programming instructions that assert the solar panel current sensor enable signal ISENSE_EN, the current sense amplifier 710 outputs a voltage on the solar panel current sensor signal SLR_ISENSE that is indicative of the solar panel current. The solar panel current sense signal SLR_ISENSE may be input to an ADC channel of the controller 230 so that the solar panel current sense signal SLR_ISENSE is converted to a digital value representing the solar panel current supplied by the solar panel 250.

The digital values representing the current supplied by the solar panel 250 can be sent, by the solar-powered asset tracker 300, over the network interface 220, to the asset tracking server 130. The digital values representing the current supplied by the solar panel 250 can be analyzed and/or correlated with other data.

Rechargeable Battery Charge and Discharge Sensor

The solar-powered asset tracker 300 also needs to determine whether the rechargeable battery 210 is being charged by the solar panel 250 or is being discharged while powering the components of the solar-powered asset tracker 300. The magnitude of both the rechargeable battery charging current and the rechargeable battery discharging current are also helpful in determining metrics such as charging rate and the discharging rate of the rechargeable battery 210. The solar-powered asset tracker 300 has a rechargeable battery current sensor 425 connected to the positive terminal of the rechargeable battery 210 (via the top battery switch 420).

Figure 8:
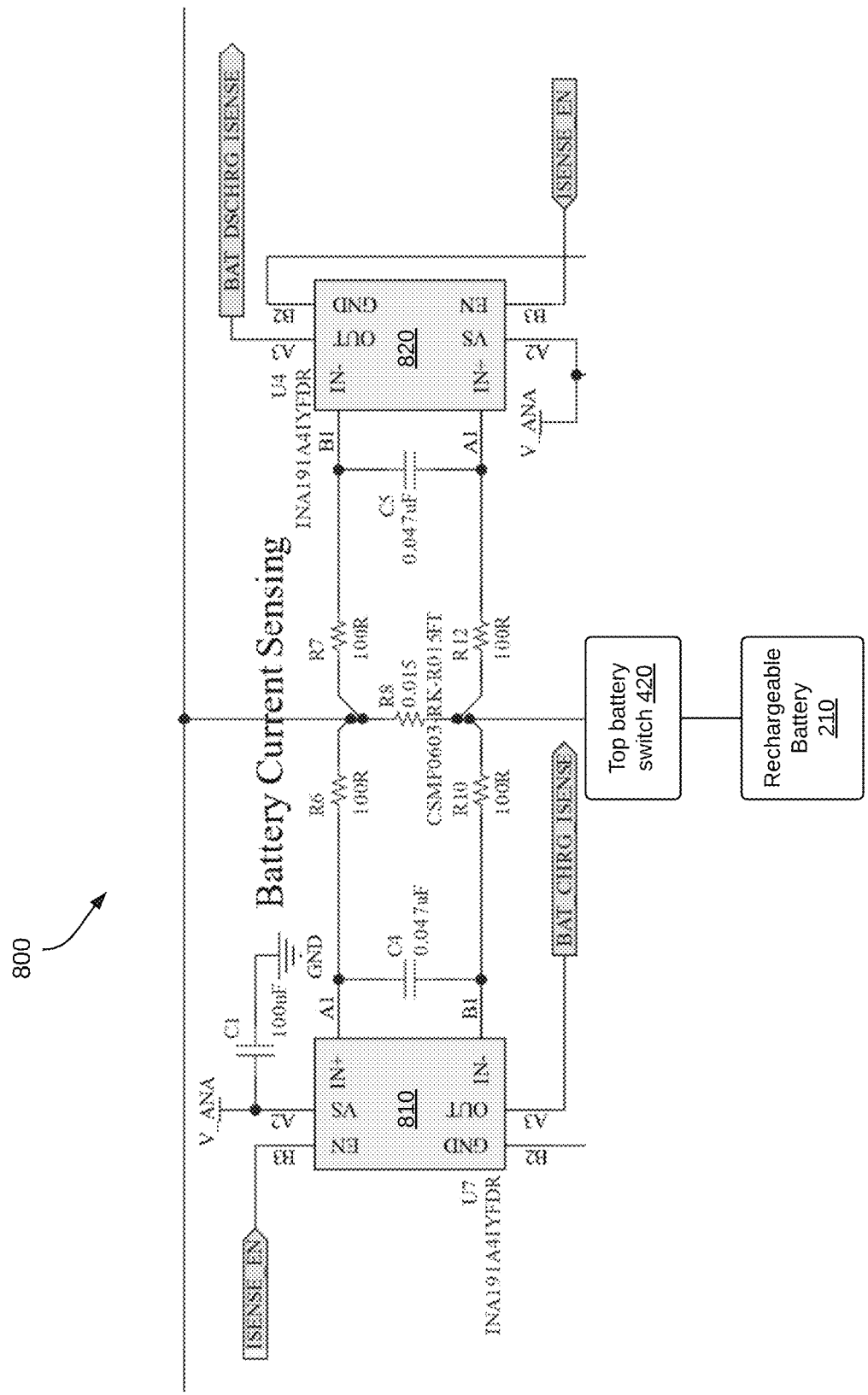
FIG. 8 is a schematic depicting an exemplary implementation of a rechargeable battery current sensor circuit, in accordance with embodiments of the present disclosure.

FIG. 8 depicts a bidirectional current sensor 800, that is an implementation of the rechargeable battery current sensor 425, in accordance with embodiments of the present disclosure. The bidirectional current sensor 800 is comprised of two oppositely coupled current sensors for measuring the rechargeable battery current in both the charging and discharging directions. The charging direction is when current is flowing from the solar panel 250 towards the rechargeable battery 210. The discharging direction is when the current is flowing from the rechargeable battery 210 to the solar panel 250. In the depicted implementation, the charging current is measured by the charging current sense amplifier 810, and the discharging current is measured by the discharging current sense amplifier 820. Each of the charging current sense amplifiers 810 and the discharging current sense amplifier 820 may be implemented by the INA191 current sense amplifier. A shunt resistor R8 is connected to the rechargeable battery 210 via the top battery switch 420.

When current flows through the shunt resistor R8 in the charging direction, and the charging current sense amplifier enable signal ISENSE_EN is asserted, the charging current sense amplifier 810 measures the rechargeable battery charging current and provide a rechargeable battery charging current signal BAT_CHRG_ISENSE which is an analog voltage that may be converted by an ADC to a value representing the rechargeable battery charging current.

When current flows through the shunt resistor R8 in the discharging direction, and the discharging current sense amplifier enable signal ISENSE_EN is asserted, the discharging current sense amplifier 820 measures the rechargeable battery discharging current and provide a rechargeable battery discharging current signal BAT_DSCHRG_ISENSE which is an analog voltage that may be converted by an ADC to a value representing the rechargeable battery charging current.

The controller 230 may have a built-in ADC that converts both the rechargeable battery charging current signal and the rechargeable battery discharging current signal to digital values. The rechargeable battery charging and discharging current values may be sent over the network 50 to the asset tracking server 130 via the network interface 220 for recording and analysis. The rechargeable battery charging current, for example, can be used to determine how many minutes or hours until the rechargeable battery 210 becomes fully charged.

Unregulated Voltage Sensing

The bus connecting the solar panel 250, the rechargeable battery 210, and all the peripherals represented by the load 480 is termed the "unregulated voltage bus" 488 because the voltage on such a bus can vary. The voltage of the unregulated voltage bus 488 is measured by the unregulated voltage sensor 435. The voltage that the unregulated voltage sensor 435 measures will depend on whether the rechargeable battery 210 is connected to the unregulated voltage bus 488 or not. As can be seen in FIG. 4, the rechargeable battery 210 can be connected, at the positive terminal thereof, to the unregulated voltage bus 488 by closing the top battery switch 420 (and closing the bottom battery switch 430 to close the circuit and connect the negative terminal of the rechargeable battery 210 to the ground). Similarly, the solar panel 250 is connected, at the positive terminal thereof, to the unregulated voltage bus 488 (via the solar panel current sensor 415). Accordingly, the solar panel 250 and the rechargeable battery 210 are both connected at respective positive terminals thereof with the controller 230 and the plurality of peripherals via the unregulated voltage bus 488.

When the top battery switch 420 and the bottom battery switch 430 are both closed, the rechargeable battery 210 is connected to the unregulated voltage bus 488. When both the rechargeable battery 210 and the solar panel 250 are connected to the unregulated voltage bus 488, the unregulated voltage sensor 435 measures the battery voltage of the rechargeable battery 210. The solar panel 250 is considered a current source and the voltage for the solar panel 250 varies with the intensity of the sun radiation incident on the solar panel 250. For example, solar radiation varies from sunny days to partly cloudy days, to mostly cloudy days. Other weather conditions and events such as fog, smoke from forest fires, and sandstorms also affect the solar panel voltage.

When the top battery switch 420 and the bottom battery switch 430 are open, the rechargeable battery 210 is disconnected from the unregulated voltage bus 488. When the rechargeable battery 210 is disconnected from the unregulated voltage bus 488, the unregulated voltage sensor 435 measures the solar panel voltage at the positive terminal of the solar panel 250.

In some embodiments, the top battery switch 420 or the bottom battery switch 430 is one of a Bipolar Junction Transistor (BJT) switch, a relay, a Solid-State Relay (SSR), an Integrated Circuit (IC) switch, and an optocoupler. If MOSFET technology is to be used, due to the presence of the body diode when an NFET or a PFET is off, the top battery switch 420 is a PFET and the bottom battery switch is an NFET. This embodiment will be described below with reference to FIG. 10.

Preventing unnecessary discharging/charging

As discussed above, it is desirable to reduce the charge/discharge cycles for the rechargeable battery 210 in order to prolong the life of the rechargeable battery 210. For this reason, the power management subsystem 400 disconnects the rechargeable battery 210 from the load 480 when two conditions are satisfied. The first condition is that the solar panel 250 is producing sufficient electrical energy to power the load 480. The second condition is that the rechargeable battery 210 is fully charged. As discussed, the first condition is determined by the solar panel bottom voltage sensor 405. In this case, current flows from the solar panel 250 to the rechargeable battery 210 thus charging the battery. The second condition is when the rechargeable battery 210 voltage reaches a maximum battery voltage that indicates that the rechargeable battery 210 is fully charged. Specifically, a fully-charged rechargeable battery will have a maximum battery voltage measured at the terminals thereof. For example, a fully charged 4.2V Li-Ion battery will have 4.2V across the positive and negative terminals thereof. Once the battery loses some of its charge, the voltage between the positive and negative terminals thereof drops.

When the battery voltage rises and reaches a maximum battery voltage threshold, this indicates that the rechargeable battery 210 is fully charged. The unregulated voltage sensor 435 outputs an unregulated voltage signal to the controller 230 reflecting the rechargeable battery voltage. The unregulated voltage sensor output is an analog voltage indicating the voltage on the unregulated voltage bus 488. The controller 230 can compare the rechargeable battery voltage with a maximum battery voltage. If the rechargeable battery voltage reaches the maximum battery voltage, the controller 230 determines that the rechargeable battery 210 is fully charged. In response to determining that the rechargeable battery 210 is fully charged, and knowing (from the solar panel bottom voltage sensor 405) that the solar panel 250 is generating enough power to power up the peripherals, the controller 230 disengages the rechargeable battery 210 from the peripherals. Specifically, the controller 230 outputs control signals that open the top battery switch 420 and the bottom battery switch 430. Advantageously, the rechargeable battery 210 is not discharged and recharged unnecessarily and the life of the rechargeable battery 210 is prolonged.

Figure 9:
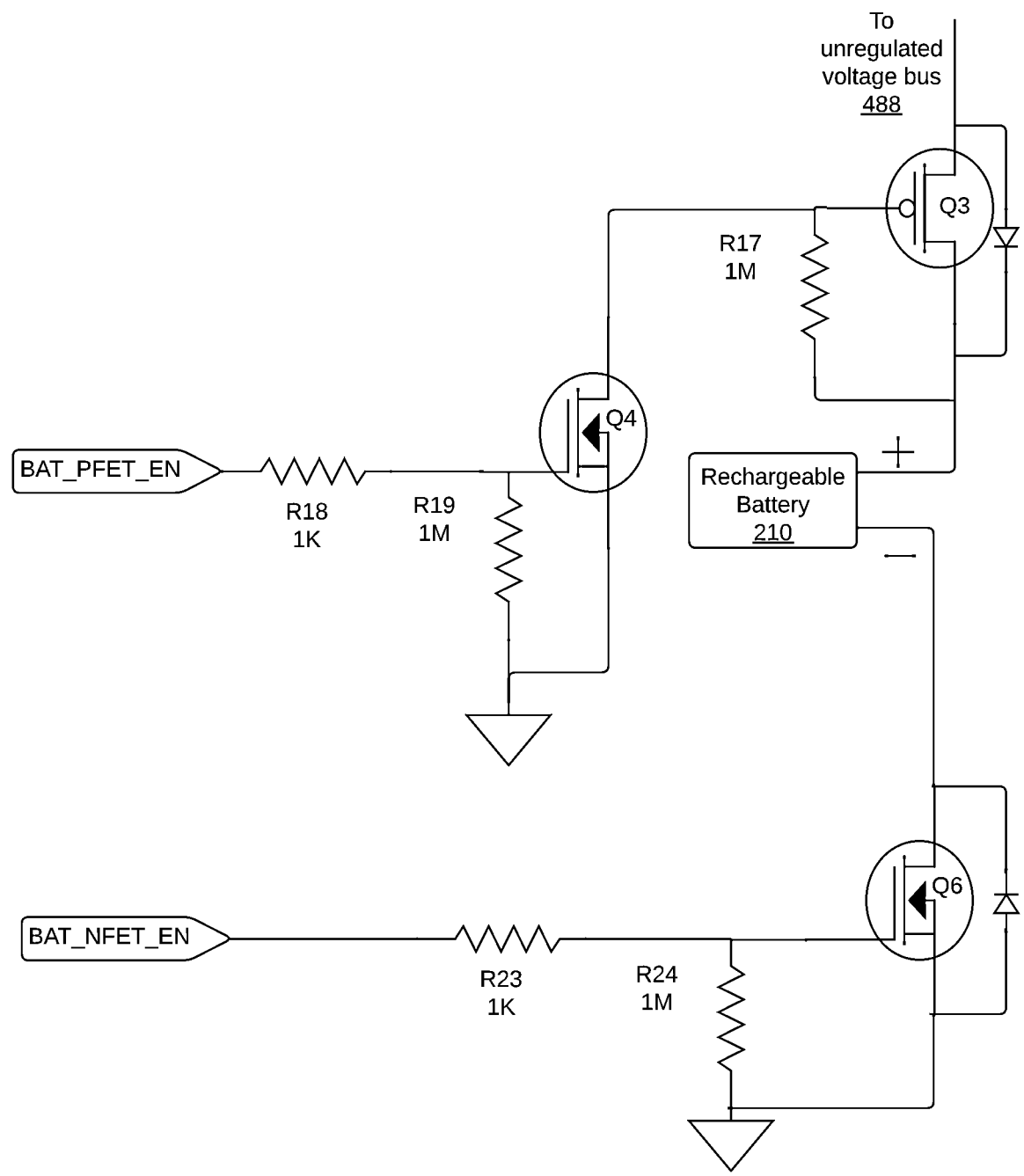
FIG. 9 is a schematic depicting an exemplary implementation of a top battery switch and a bottom battery switch, in accordance with embodiments of the present disclosure.

FIG. 9 depicts a simplified implementation of the top battery switch 420 and the bottom battery switch 430, in accordance with embodiments of the present disclosure.

In the depicted embodiment, the top battery switch 420 is comprised of a PFET Q3 with a 1M resistor R17 connected between the gate and the source thereof. The gate of the PFET Q3 is connected to the drain of an NFET Q4, the source of the PFET Q3 is connected to the positive terminal of the rechargeable battery 210, and the drain of the PFET Q3 is connected to the unregulated voltage bus 488. The gate of the NFET Q4 is connected to a top battery switch control signal named BAT_PFEN_EN via a 1K resistor R18. The gate of the NFET Q4 is also connected to the ground via a 1M resistor R19. When the top battery switch control signal BAT_PFEN_EN is de-asserted, the NFET Q4 is off. No current passes through Q4 and therefore the voltage on the gate of Q3 is equal to the voltage on the source of Q3. Since Vsg of Q3 is 0, Q3 is off. When the top battery switch control signal BAT_PFET_EN is asserted Q4 turns on and current flows from the positive terminal of the rechargeable battery 210, through R17 and through Q4. The current passing through R17 causes a voltage drop such that Vsg of Q3 is greater than the threshold voltage for Q3 and Q3 turns on thus connecting the positive terminal of the rechargeable battery 210 to the unregulated voltage bus 488.

The bottom battery switch 430 is implemented as an NFET Q6 having the drain thereof connected to the negative terminal of the rechargeable battery 210 and the source thereof connected to ground. A bottom battery switch control signal BAT_NFET_EN is connected to the gate of Q6 via a 1K resistor R23, and the gate of Q3 is connected to ground via a 1M resistor R24. When the bottom battery switch control signal BAT_NFET_EN is de-asserted, Q6 is off, and the negative terminal of the rechargeable battery 210 is not connected to ground. Conversely, when the bottom battery switch control signal BAT_NFET_EN is asserted, current flows through R23 then R24 to ground. The voltage drop across R23 causes Vgs for Q6 to be greater than the threshold voltage and Q6 turns on thus connecting the negative terminal of the rechargeable battery 210 to ground.

It should be noted that the PFET Q3 and the NFET Q4 each has a body diode when in cut-off mode but since Q3 is a PFET and Q4 is an NFET the respective body diodes thereof conduct current in opposite directions. Accordingly, when both BAT_PFET_EN and BAT_NFET_EN are de-asserted, Q3 and Q4 are off, and no current passes to or from the rechargeable battery 210.

Handling Brownouts Due to Drop in Solar Radiation

As discussed above, the rechargeable battery 210 may be disconnected from the unregulated voltage bus 488 (and hence the rest of the system) when the rechargeable battery 210 is fully charged and the solar panel 250 is capable of powering the system. In such conditions, there is a risk of brownout if the solar panel 250 is no longer capable of providing enough power to power the load 480.

When the rechargeable battery 210 is disconnected from the unregulated voltage bus 488, the unregulated voltage sensor 435 compares the solar panel voltage with a brownout voltage threshold. For example, it may be known that some of the peripherals of the asset tracker do not work with supply voltages below 3.5V. In response to the solar panel voltage (i.e., the voltage of the unregulated voltage bus 488) reaching or dropping below the brownout voltage threshold, the unregulated voltage sensor 435 signals the controller 230 indicating that the solar panel voltage is too low for the operation of the solar-powered asset tracker 300. In response to receiving a signal indicating that the solar panel voltage has reached the brownout threshold, the controller 230 closes both the top battery switch 420 and the bottom battery switch 430, thereby engaging the rechargeable battery 210. Advantageously, connecting the rechargeable battery 210 back prevents a brownout condition that could take place when the solar panel 250 does not have sufficient sun radiation to generate adequate current to power the asset tracker's peripherals.

When switching between the solar panel 250 and the rechargeable battery 210 an instantaneous drop in voltage on the unregulated voltage bus 488 may take place. The bulk capacitor 440 remedies that situation. The bulk capacitor 440 charges from the solar panel 250 or the rechargeable battery 210 and in the event of an instantaneous drop (brownout), the bulk capacitor 440 discharges to the unregulated voltage bus 488 thus keeping the unregulated voltage bus 488 at a voltage level that is higher than the brownout voltage threshold.

Advantageously, when the solar panel 250 is capable of the operation of the electronic device (i.e., the solar-powered asset tracker 300) then the rechargeable battery 210 is not engaged. In this case, the rechargeable battery 210 is not unnecessarily discharged and recharged, particularly if the rechargeable battery 210 is already full. The discharge/recharge cycles of the rechargeable battery 210 are reduced thus prolonging the life of the rechargeable battery 210. Conversely, when the solar panel 250 is incapable of supplying enough current to drive all the required peripherals used in an expected operation, then the rechargeable battery 210 is engaged to prevent a brownout condition.

Handling Rechargeable Battery Failure

Another problem that is mitigated by the present disclosure is that of the rechargeable battery failure. The rechargeable battery 210 has a particular life and when it reaches the end of that life, the voltage provided by the rechargeable battery drops below a minimum voltage threshold that the peripherals of the solar-powered asset tracker 300 needs to function. When this takes place, the solar-powered asset tracker 300 checks whether the solar panel 250 can power the solar-powered asset tracker 300. If the solar panel 250 can power the solar-powered asset tracker 300 (as determined from the solar panel bottom voltage 408), the solar panel bottom NFET 410 is closed to connect the solar panel 250 to the ground allowing the solar panel 250 to efficiently power the load 480. If the solar panel 250 cannot power the solar-powered asset tracker, the solar-powered asset tracker shuts down until the solar panel 250 has enough radiation to produce sufficient electric energy to power up the system. With reference to FIG. 4, when there is sufficient electric energy produced by the solar panel 250, current flows through the body diode of the solar panel bottom NFET 410 into the negative terminal of the solar panel 250 and out of the positive terminal of the solar panel 250 to the load 480. The current turns on the controller 230 which checks the solar panel bottom voltage 408. In response to detecting that the solar panel bottom voltage 408 indicates that the solar panel 250 is generating electrical energy, the controller 230 enables (i.e., closes) the solar panel bottom NFET 410 thus allowing the solar-powered asset tracker 300 to run off of the solar panel 250, and send a notification regarding the detective battery to the asset tracking server 130.

Figure 10:
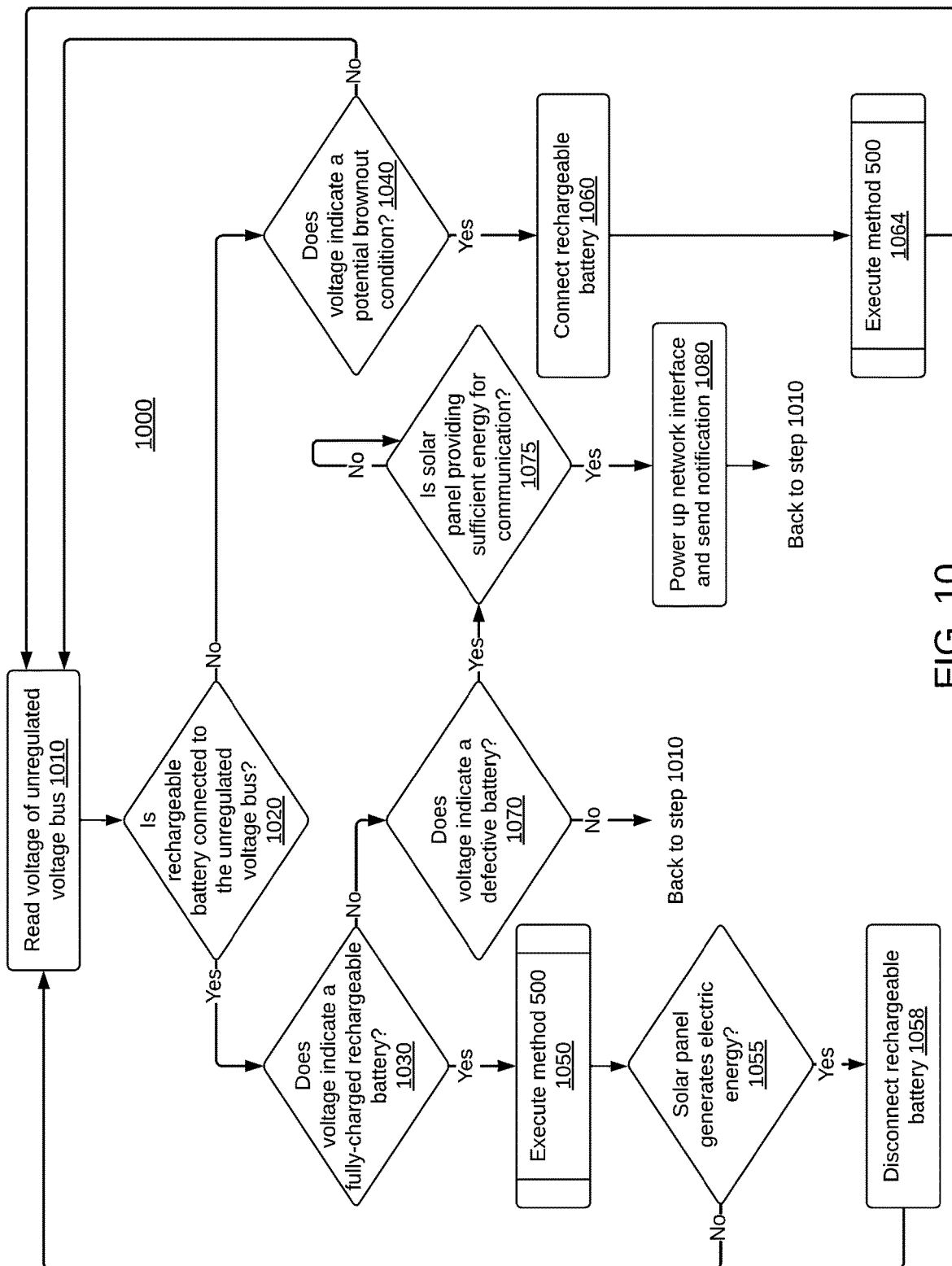
FIG. 10 is a flowchart of a method by an electronic device having a solar panel and a rechargeable battery, in accordance with embodiments of the present disclosure.

FIG. 10 depicts a method 1000 of controlling a solar-powered electronic device powered by a solar panel and a rechargeable battery connected to the unregulated voltage bus 488 as depicted in FIG. 4.

Figure 11:
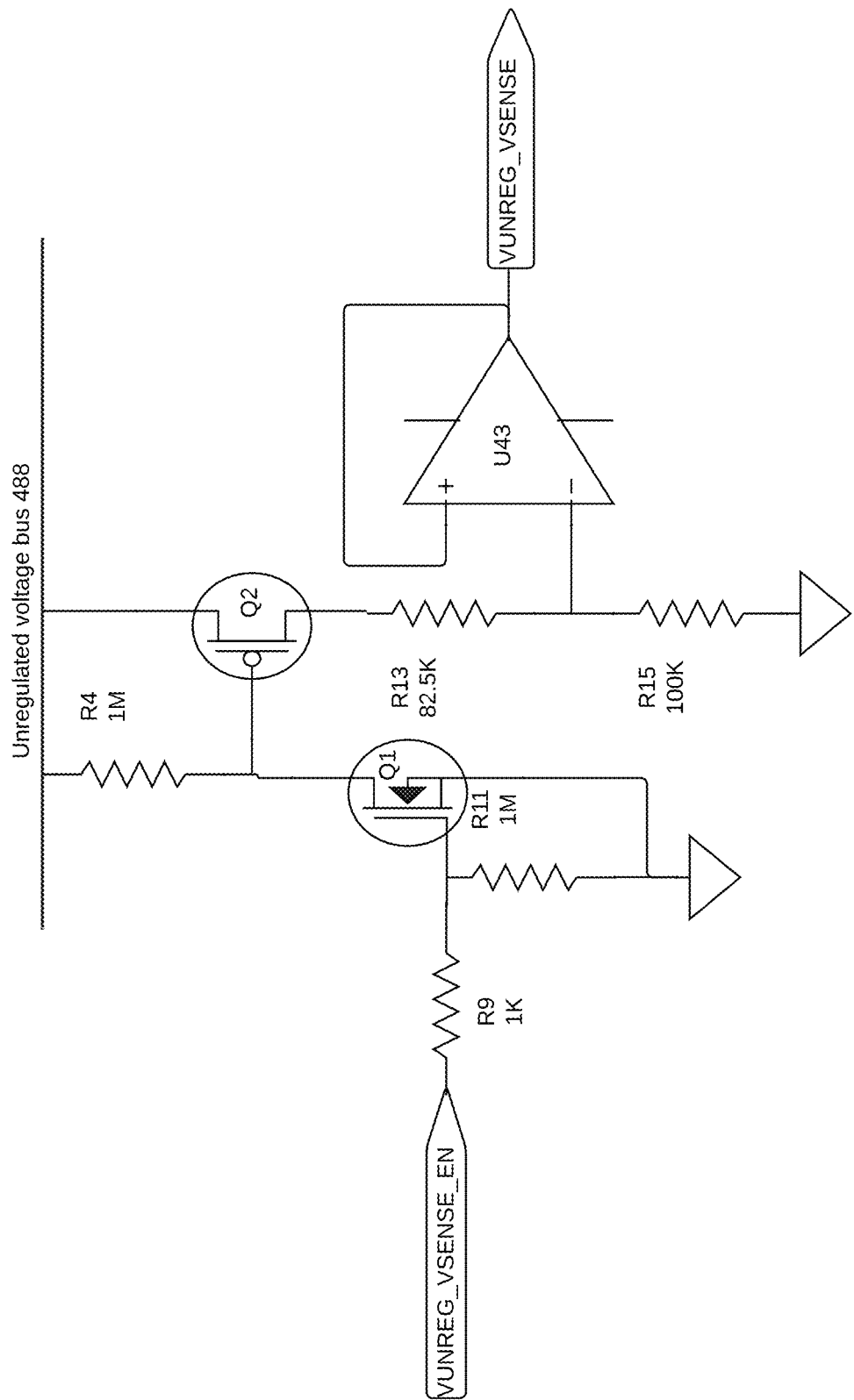
FIG. 11 is a simplified circuit diagram of a voltage sensor for measuring the voltage of the unregulated voltage bus.

At step 1010, the electronic device reads the voltage of the unregulated voltage bus. For example, the controller 230 may execute firmware machine-executable programming instructions which enable the unregulated voltage sensor 435. The output of the unregulated voltage sensor 435 is an analog voltage representing the voltage of the unregulated voltage bus. With reference to FIG. 11, there is shown an exemplary unregulated voltage sensor, in accordance with embodiments of the present invention. The depicted unregulated voltage sensor is comprised of an op amp U43 in a voltage follower arrangement. The inverting input of the op amp U43 is from the center of a voltage divider connected to the unregulated voltage bus 488 via a PFET switch Q2. The voltage divider is comprised of a resistor R13 and a resistor R15 as shown. The output of op amp U43 is an analog signal representing the voltage of the unregulated voltage bus 488 (VUNREG_VSENSE). The controller 230 can enable the unregulated voltage sensor via the unregulated voltage sensor enable signal VUNREG_VSENSE_EN. The unregulated voltage sensor enable signal VRUNEG_VENSE_EN is input to the gate of an NFET switch Q1 which is connected at the drain thereof to the gate of the PFET Q2 and to the unregulated voltage bus 488 via the resistor R4.

When the unregulated voltage sensor enable signal VRUNEG_VENSE_EN is de-asserted, Vgs for Q1 is 0V and Q2 is off. Since no current flows through Q1, no current flows through R4. The voltage at the gate of Q2 is higher than the voltage at the source of Q2. Vsg is less than the threshold voltage. Accordingly Q2 is off, and the inverting input of the op amp U43 is not connected to the unregulated voltage bus 488.

When the unregulated voltage sensor enable signal VRUNEG_VENSE_EN is asserted, current flows through R11 causing the voltage Vgs to exceed the threshold voltage for the NFET Q1. NFET Q1 turns on causing current to flow through R4 and the voltage at the gate of Q2 becomes 0V. As a result, Vsg for Q2 is greater than the threshold voltage for a PFET. Current flows through Q1, R13, and R15. The inverting input of U43 is a voltage representing the voltage drop on R15 which is proportional to the unregulated voltage bus 488.

The output of the unregulated voltage sensor is input into an ADC channel of either a dedicated ADC or one built into the controller 230. The solar-powered electronic device firmware can determine the voltage of the unregulated voltage bus.

Turning back to FIG. 10. At step 1020, the electronic device determines whether the rechargeable battery 210 is connected to the unregulated voltage bus 488. In other words, the electronic device determines whether at least one switch between the rechargeable battery 210 and the unregulated voltage bus 488 are open or closed. When the at least one switch between the rechargeable battery 210 and the unregulated voltage bus is closed, then control goes to step 1030. If the at least one switch between the rechargeable battery 210 and the unregulated voltage bus 488 are open, control goes to step 1040. In some implementations, the at least one switch comprises the top battery switch 420 and/or the bottom battery switch 430 as discussed above.

At step 1030, the electronic device has determined that the rechargeable battery 210 is connected to the unregulated voltage bus 488. In this case, the electronic device concludes that the voltage of the unregulated voltage bus 488 represents the battery voltage of the rechargeable battery 210. At step 1030, the electronic device checks whether the battery voltage indicates that the rechargeable battery 210 is fully charged, i.e. that the battery voltage has reached a maximum battery voltage threshold indicating a full charge. If the battery voltage indicates that the rechargeable battery 210 is fully charged, then control goes to step 1050. If the battery voltage indicates that the rechargeable battery 210 is not fully charged, then control goes to step 1070.

At step 1050, the electronic device has determined that the rechargeable battery 210 is fully charged. However, before disconnecting the battery, the electronic device first determines whether the solar panel 250 can power the electronic device. Accordingly, at step 1050, the electronic device executes the method 500 of FIG. 5 which includes the step of reading the solar panel bottom voltage 408 and determining whether the solar panel 250 generates sufficient electric energy. At step 1055, if the solar panel 250 is providing sufficient electrical energy to power the electronic device, control goes to step 1058. If the solar panel 250 is not providing sufficient electrical energy, control goes back to step 1010.

At step 1058, the electronic device disconnects the rechargeable battery from the unregulated voltage bus, by opening a switch therebetween, for example. For example, the electronic device may de-assert the top battery switch control signal BAT_PFET_EN and de-assert the bottom battery switch control signal BAT_NFET_EN. The top battery switch 420 and the bottom battery switch 430 are turned off and the rechargeable battery 210 is isolated from the load 480. The load 480 is powered solely by the solar panel 250. The discharge/recharge of the rechargeable battery 210 is stopped thus prolonging the life of the rechargeable battery 210. Subsequent to that, control goes back to step 1010.

At step 1070, the rechargeable battery 210 is not fully charged. The electronic device checks whether the voltage of the unregulated voltage bus 488 indicates that the rechargeable battery 210 may be defective. A battery is defective when the voltage drops to a defective voltage threshold. As an example, a battery may be at full capacity when its voltage is 3.5V and at a minimum capacity when its voltage is 2.5V. If the battery drops below 2.5V, such as to 2.0V, this may indicate that the battery is wearing out and may not charge back to its full capacity or may take a long time to charge back to its full capacity. In such cases, it is advisable to send a notification indicating that the battery may need to be replaced or that the electronic device needs to be replaced (if the battery is non-removable). If the rechargeable battery 210 is determined to be defective based on the measured voltage of the unregulated voltage bus 488, control goes to 1075. If the battery is not defective, control goes back to step 1010. One way to determine the defective battery condition is through comparing the voltage of the unregulated voltage bus against a defective voltage threshold. This may be done via firmware executed by a controller of the electronic device such as the controller 230.

At step 1075, the electronic device checks whether the solar panel 250 can provide sufficient energy for the electronic device to perform a communication action. Specifically, the electronic device checks whether the solar panel 250, can power up the network interface 220 to transmit a notification message to a remote server, such as the asset tracking server 130. When the solar panel 250 is capable of providing sufficient electrical energy to power up the network interface, control goes to step 1080. When the solar panel 250 is not capable of providing sufficient electrical energy to power up the network interface 220, the electronic device waits in step 1075. If the implementation of the circuit of FIG. 6 is used, when the solar panel 250 is capable of providing sufficient electrical energy, the controller can detect this based on the solar panel bottom voltage 408, and control goes to step 1080.

At step 1080, the electronic device powers up the network interface 220 and sends a notification to a remote server indicating that the rechargeable battery 210 of the electronic device needs to be replaced. Control then goes back to step 1010.

At step 1040, the electronic device determines that the rechargeable battery 210 is disconnected from the unregulated voltage bus 488. The electronic device is aware of the status of the at least one switch (e.g., the top battery switch 420 and the bottom battery switch 430) between the rechargeable battery 210 and the unregulated voltage bus 488 as that switch is operated under control of the electronic device, such as by firmware executed by a controller 230 of the electronic device. Since the rechargeable battery 210 is disconnected from the unregulated voltage bus 488, then the voltage of the unregulated voltage bus 488 represents the voltage provided by the solar panel 250 as applied to the peripherals (i.e., the load 480 and the controller 230) of the electronic device. The electronic device determines a minimum unregulated voltage bus voltage below which some peripherals may not work correctly or at all. This minimum unregulated voltage bus voltage may be termed the brownout voltage or the brownout threshold. If the voltage of the unregulated voltage bus 488 is at or below the brownout threshold, then the electronic device determines a potential brownout condition and control goes to step 1060. If the voltage of the unregulated voltage bus is above the brownout threshold, control goes back to step 1010.

At step 1060, the electronic device connects the rechargeable battery 210 to the unregulated voltage bus 488 to prevent a brownout condition. For example, the controller 230 asserts the top battery switch control signal BAT_PFET_EN and asserts the bottom battery switch control signal BAT_NFET_EN, to enable both the top battery switch 420 and the bottom battery switch, respectively. The electronic device may also execute step 1060 in response to detecting, by the falling threshold detector 445 that the voltage of the unregulated voltage bus has fallen below the minimum unregulated voltage bus while the rechargeable battery 210 is disconnected from the unregulated voltage bus 488 (i.e., after executing step 1058). In response to detecting that the voltage of the unregulated bus 488 has fallen below the minimum unregulated voltage bus, the falling threshold detector 445 asserts an interrupt line to the controller 230 that triggers an interrupt event therewith. In response to the interrupt event, the controller 230 executes firmware instructions which execute step 1060 connecting the rechargeable battery 210 to the unregulated voltage bus 488.

At step 1064, the electronic device executes the method 500 described above with reference to FIG. 5. In this method, the electronic device decides whether to connect the solar panel 250 based on whether the solar panel 250 is capable of producing sufficient electrical energy. As discussed above, the method 500 executes periodically by the electronic device to determine whether the solar panel 250 should be disconnected from the ground to prevent the draining of the rechargeable battery 210 through the solar panel 250.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method, in an electronic device comprising a power management subsystem, a controller, and a plurality of peripherals, the electronic device powered by a solar panel and a rechargeable battery both connected at respective positive terminals thereof with the controller and the plurality of peripherals via an unregulated voltage bus, the method comprising:
reading a voltage of the unregulated voltage bus; and
in response to determining that the rechargeable battery is connected to the unregulated voltage bus:
in response to determining, based on the voltage of the unregulated voltage bus, that the rechargeable battery is fully charged:
in response to determining that the solar panel provides sufficient electric energy, disconnecting the rechargeable battery from the unregulated voltage bus;
wherein the solar panel provides sufficient electric energy when current flows from the solar panel to the rechargeable battery.

2. The method of claim 1, wherein determining that the solar panel provides sufficient electric energy comprises:
disconnecting a negative terminal of the solar panel from a ground terminal; and
detecting, by a voltage sensor, a negative voltage at the negative terminal of the solar panel.

3. The method of claim 2, wherein:
the voltage sensor comprises an operational amplifier having an inverting input, a non-inverting input, a positive supply terminal, a negative supply terminal, and an output;
the negative supply terminal is connected to the negative terminal of the solar panel;
the output of the operational amplifier is connected to the inverting input;
a voltage sensor signal of the voltage sensor is the output of the operational amplifier;
the non-inverting input of the operational amplifier is connected to ground; and
enabling the voltage sensor comprises asserting, by the controller, a signal connected to the positive supply terminal of the operational amplifier.

4. The method of claim 3, wherein:
the voltage sensor signal of the voltage sensor comprises a positive analog signal; and
reading the voltage sensor signal of the voltage sensor comprises converting the positive analog signal to a digital value.

5. The method of claim 1, wherein:
the negative terminal of the solar panel is connected with a ground terminal via an N-channel Field Effect Transistor (NFET) switch having a source, a gate, and a drain;
the NFET switch is connected at the source thereof to the ground terminal and connected at the drain thereof to the negative terminal of the solar panel; and
determining that the solar panel is generating sufficient energy comprises detecting a negative voltage at the drain of the NFET switch.

6. The method of claim 1, wherein disconnecting the rechargeable battery from the unregulated voltage bus comprises:
opening a top battery switch between a positive terminal of the rechargeable battery and the unregulated voltage bus; and
opening a bottom battery switch between a negative terminal of the rechargeable battery and a ground terminal.

7. The method of claim 1, further comprising:
in response to determining that the rechargeable battery is connected to the unregulated voltage bus:
in response to determining, based on the voltage of the unregulated voltage bus, that the rechargeable battery is defective:
in response to determining that the solar panel provides sufficient electric energy to power up a network interface of the electronic device, powering up the network interface and sending a notification to a remote server indicating that the rechargeable battery is defective.

8. The method of claim 1, further comprising:
in response to determining that the rechargeable battery is disconnected from the unregulated voltage bus:
in response to determining a potential brownout condition based on the voltage of the unregulated voltage bus:
connecting the rechargeable battery to the unregulated voltage bus.

9. The method of claim 8, further comprising:
in response to determining that the rechargeable battery is disconnected from the unregulated voltage bus:
in response to determining a potential brownout condition based on the voltage of the unregulated voltage bus:
in response to determining that the solar panel is not generating sufficient electric energy, disconnecting the solar panel at the negative terminal thereof from a ground terminal.

10. The method of claim 9, wherein:
the negative terminal of the solar panel is connected with the ground terminal via an N-channel Field Effect Transistor (NFET) switch having a source, a gate, and a drain;
the NFET switch is connected at the source thereof to the ground terminal and connected at the drain thereof to the negative terminal of the solar panel; and
determining that the solar panel is not generating sufficient energy comprises detecting a positive voltage at the drain of the NFET switch.

11. An electronic device, comprising:
a controller;
a memory coupled to the controller;
a plurality of peripherals coupled to the controller;
an unregulated voltage bus;
a rechargeable battery for providing power to the controller, the memory, and the plurality of peripherals via the unregulated voltage bus;
a solar panel for recharging the rechargeable battery and for providing power to the controller, the memory, and the plurality of peripherals via the unregulated voltage bus;
a power management subsystem coupled to the controller, the rechargeable battery, and the solar panel;
the memory storing machine-executable programming instructions which, when executed by the controller, configures the electronic device to:
read a voltage of the unregulated voltage bus; and
in response to determining that the rechargeable battery is connected to the unregulated voltage bus:
in response to determining, based on the voltage of the unregulated voltage bus, that the rechargeable battery is fully charged:
in response to determining that the solar panel provides sufficient electric energy, disconnect the rechargeable battery from the unregulated voltage bus;
wherein the solar panel provides sufficient electric energy when current flows from the solar panel to the rechargeable battery.

12. The electronic device of claim 11, wherein the machine-executable programming instructions which configure the electronic device to determine that the solar panel provides sufficient electric energy comprise machine-executable programming instructions which configure the electronic device to:
disconnect the negative terminal of the solar panel from a ground terminal; and
detect, by a voltage sensor, a negative voltage at the negative terminal of the solar panel.

13. The electronic device of claim 12, wherein:
the voltage sensor comprises an operational amplifier having an inverting input, a non-inverting input, a positive supply terminal, a negative supply terminal, and an output;
the negative supply terminal is connected to the negative terminal of the solar panel;
the output of the operational amplifier is connected to the inverting input;
a voltage sensor signal of the voltage sensor is the output of the operational amplifier;
the non-inverting input of the operational amplifier is connected to ground; and
the machine-executable programming instructions which configure the electronic device to enable the voltage sensor comprise machine-executable programming instructions which configure the electronic device to assert, by the controller, a signal connected to the positive supply terminal of the operational amplifier.

14. The electronic device of claim 13, wherein:
the voltage sensor signal of the voltage sensor comprises a positive analog signal; and
the machine-executable programming instructions which configure the electronic device to read the voltage sensor signal of the voltage sensor comprise machine-executable which configure the electronic device to convert the positive analog signal to a digital value.

15. The electronic device of claim 11, wherein:
the negative terminal of the solar panel is connected with a ground terminal via an N-channel Field Effect Transistor (NFET) switch having a source, a gate, and a drain;
the NFET switch is connected at the source thereof to the ground terminal and connected at the drain thereof to the negative terminal of the solar panel; and
the machine-executable programming instructions which configure the electronic device to determine that the solar panel is generating sufficient energy comprise machine-executable programming instructions which configure the electronic device to detect a negative voltage at the drain of the NFET switch.

16. The electronic device of claim 11, wherein the machine-executable programming instructions which configure the electronic device to disconnect the rechargeable battery from the unregulated voltage bus comprise machine-executable programming instructions which configure the electronic device to:
open a top battery switch between a positive terminal of the rechargeable battery and the unregulated voltage bus; and
open a bottom battery switch between a negative terminal of the rechargeable battery and a ground terminal.

17. The electronic device of claim 11, wherein the machine-executable programming instructions further configure the electronic device to:
in response to determining that the rechargeable battery is connected to the unregulated voltage bus:
in response to determining, based on the voltage of the unregulated voltage bus, that the rechargeable battery is defective:
in response to determining that the solar panel provides sufficient electric energy to power up a network interface of the electronic device, power up the network interface and send a notification to a remote server indicating that the rechargeable battery is defective.

18. The electronic device of claim 11, wherein the machine-executable programming instructions further configure the electronic device to:
in response to determining that the rechargeable battery is disconnected from the unregulated voltage bus:
in response to determining that a potential brownout condition based on the voltage of the unregulated voltage bus:
connect the rechargeable battery to the unregulated voltage bus.

19. The electronic device of claim 18, wherein the machine-executable programming instructions further configure the electronic device to:
in response to determining that the rechargeable battery is disconnected from the unregulated voltage bus:
in response to determining that a potential brownout condition based on the voltage of the unregulated voltage bus:
in response to determining that the solar panel is not generating sufficient electric energy, disconnect the solar panel at the negative terminal thereof from a ground terminal.

20. The electronic device of claim 19, wherein:

the negative terminal of the solar panel is connected with the ground terminal via an N-channel Field Effect Transistor (NFET) switch having a source, a gate, and a drain;

the NFET switch is connected at the source thereof to the ground terminal and connected at the drain thereof to the negative terminal of the solar panel; and the machine-executable programming instructions which configure the electronic device to determine that the solar panel is not generating sufficient energy comprise machine-executable programming instructions which configure the electronic device to detect a positive voltage at the drain of the NFET switch.

\* \* \* \* \*